(12) United States Patent
Brewton et al.

(10) Patent No.: US 8,719,949 B1
(45) Date of Patent: May 6, 2014

(54) PARAMETER BASED OPERATION

(75) Inventors: Nathan E. Brewton, Wayland, MA (US); Victor Chudnovsky, Brookline, MA (US); Joe Dipietro, Worcester, MA (US); Jeffrey Wendlandt, Newton, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 13/556,883

(22) Filed: Jul. 24, 2012

Related U.S. Application Data

(63) Continuation of application No. 11/581,961, filed on Oct. 16, 2006, now Pat. No. 8,230,515.

(51) Int. Cl.
  *G06F 21/00* (2013.01)
  *G06F 9/44* (2006.01)

(52) U.S. Cl.
  USPC ............. 726/27; 709/203; 709/220; 709/223; 709/228

(58) Field of Classification Search
  USPC ............. 726/27; 709/220, 203, 228, 223, 219
  See application file for complete search history.

(56) References Cited

U.S. PATENT DOCUMENTS

| 5,671,412 | A | 9/1997 | Christiano |
| 7,743,361 | B2 * | 6/2010 | Clark ............................ 717/105 |
| 7,885,896 | B2 * | 2/2011 | Lenard et al. ................... 705/59 |
| 2003/0135756 | A1 | 7/2003 | Verma |

OTHER PUBLICATIONS

Cuellar, Luis E., "Open Source License Alternatives for Software Applications, Is it a solution to stop software piracy?" ACM-SE 43, Proceedings of the 43rd Annual Southeast Regional Conference, vol. 2:269-274 (2005).

* cited by examiner

*Primary Examiner* — Brandon Hoffman
*Assistant Examiner* — Samuel Ambaye
(74) *Attorney, Agent, or Firm* — Nelson Mullins Riley & Scarborough LLP

(57) ABSTRACT

A device may include communication logic to receive a request to perform an activity on behalf of a client, where the activity is related to a primary application and a secondary application. The communication logic may send a response that allows the client to perform the activity when the client is authorized. The device may include evaluation logic to determine whether the client is related to the primary license and to determine whether a secondary license related to the secondary application is available. The evaluation logic may allocate the available secondary license to the client for use with the secondary application when the secondary license is available. The evaluation logic may authorize the client to perform the activity when the secondary license is allocated to the client.

24 Claims, 13 Drawing Sheets

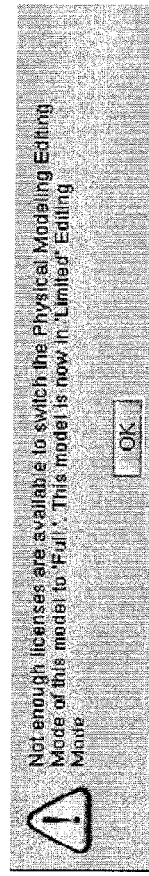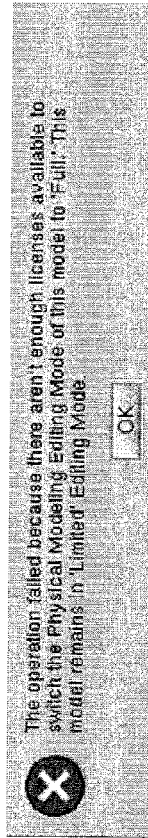

PARAMETER BASED OPERATION

RELATED APPLICATION INFORMATION

This application is a continuation of U.S. patent application Ser. No. 11/581,961, filed Oct. 16, 2006 (now U.S. Pat. No. 8,230,515, issued Jul. 24, 2012), the entire content of which are incorporated by reference herein.

BACKGROUND INFORMATION

Software applications may require one or more licenses to operate. Some software applications may be deployed as a suite that includes a main application and a number of auxiliary applications, such as application-specific software modules. These suites may require that a user have a number of licenses, such as a license for the main application and a license for each of the application-specific modules.

Users, such as corporations, government agencies, educational institutions, etc., may have a number of employees/students that may regularly use the main application and may infrequently (e.g., periodically) use the application-specific modules. These users may purchase main application licenses for each employee/student; however, these users may not want to purchase application-specific module licenses for each employee/student as the costs for all of these application-specific module licenses may be prohibitive given periodic usage of the application-specific modules.

Conventional licensing arrangements for software-based applications may not provide users with desired flexibility with respect to application-specific module licenses. As a result, users may be discouraged from using software applications that require a large number of valid application-specific module licenses when employees/students may interact with the application-specific modules infrequently.

SUMMARY OF THE INVENTION

In accordance with an aspect, a device is provided. The device may include an interface to receive a request from a client executing an application, the request related to an activity associated with the application, and send a response to the client based on information about the activity. The device may include evaluation logic to allow the application to run in a first mode when a license is available and associated with the application, the first mode allowing the client to perform activities that include the activity. The evaluation logic may further allow the application to run in a second mode when the license is unavailable, the second mode allowing the client to perform a subset of the activities, the subset excluding the activity. The evaluation logic may further generate the response, the response including a permission that allows the application to run in the first mode when the license is associated with the application or lets the application run in the second mode when the license is unavailable.

In accordance with still another aspect, a system is provided. The system may include first logic to receive a request to perform an activity on behalf of a client device, the activity related to one or more of a plurality of secondary applications operating with a primary application, the plurality of secondary applications related to a plurality of secondary licenses and to send a response, the response allowing the client device to perform the activity when the client device is authorized. The system may include second logic to determine whether the one or more of the plurality of secondary licenses related to the one or more of the plurality of secondary applications identified in the request are available. The second logic may further allocate available one or more of the plurality of secondary licenses to the client device for use with the one or more of the plurality of secondary applications, and may authorize the client device when the one or more of the secondary licenses are allocated to the client device.

In accordance with yet another aspect, a device is provided. The device may include a display to display application information to a user, the application information related to an application operating on the device. The device may include a processor to process operating mode information related to an operating mode for the application when the application information is displayed and to process a user input related to the application information when the user input can be processed in accordance with the operating mode. The processor may further request a permission when the user input cannot be processed and may process the user input when the permission is received to allow the user to interact with the application.

In accordance with still another aspect, a method is provided. The method may include identifying an operating mode for a device associated with a primary license, the operating mode determined by a number of secondary licenses in use by the device, the secondary licenses operating with the primary license and receiving a request related to an activity that the device desires to perform. The method may include determining whether the activity is authorized by evaluating the operating mode, the requested activity, or one or more secondary licenses associated with the device. The method may include allowing the device to perform the requested activity when the activity is authorized.

In accordance with yet another aspect, a method is provided. The method may include identifying an operating mode for a first data structure containing user specified information, where the identifying further includes identifying one or more permissions related to the user specified information and identifying one or more allowed activities related to the first data structure, the allowed activities based on one or more of the one or more permissions. The identifying may still further include selecting a subset of the one or more permissions based on the identified one or more allowed activities. The method may further include storing information about the identified operating mode in a second data structure and associating the second data structure with the first data structure, the associating allowing the first data structure to be opened in the identified operating mode when the subset of one or more permissions is available.

In accordance with still another aspect, a method is provided. The method may include executing a primary application and one or more secondary applications via an operating mode on a device, the primary application related to a primary license and the one or more secondary applications related to one or more secondary licenses, the operating mode determined based on the one or more secondary licenses in use on the device, the operating mode comprising a quantity of authorized activities. The method may include interacting with a data structure related to the primary application or the one or more secondary applications and processing a request for an activity related to the data structure. The method may include determining whether the activity is one of the authorized activities and performing the activity when the activity is one of the authorized activities to produce an outcome on behalf of the device.

In accordance with yet another aspect, a computer readable medium that stores instructions executable by a processing device is provided. The computer readable medium may include instructions to allocate a primary license to a client, the primary license related to a primary application on the client and instructions to process a client request for an activity related to the primary application or to a secondary application. The computer readable medium may include instructions to determine whether the client is associated with a secondary license that allows the client to perform the activity when the activity is related to the secondary application and instructions to allow the client to perform the activity when the client is associated with the secondary license.

In accordance with still another aspect, a method is provided. The method may include performing a first activity according to the first operating mode and processing a request to perform a second activity, the second activity unauthorized with respect to a first operating mode on a device. The method may include disallowing the request when a policy applied with respect to the device does not authorize the second activity via a second operating mode or allowing the second activity when the policy applied with respect to the device authorizes the second activity via the second operating mode.

In accordance with yet another aspect, a device to manage a client in a networked environment is provided. The device may include means for determining whether the client is authorized to perform a first activity identified in a request; means for allowing the client to perform the first activity when the client is authorized according to a first policy; means for receiving a mode change request on behalf of the client when the client is unauthorized according to the first policy; and means for allowing the client to perform the first activity using a second policy when the client is unauthorized according to the first policy.

BRIEF DESCRIPTION OF THE DRAWINGS

The accompanying drawings, which are incorporated in and constitute a part of this specification, illustrate one or more embodiments of the invention and, together with the description, explain the invention. In the drawings.

FIGS. 10A-10D illustrate exemplary error messages that can be displayed to an operator via a user interface;

DETAILED DESCRIPTION

Figure 1:
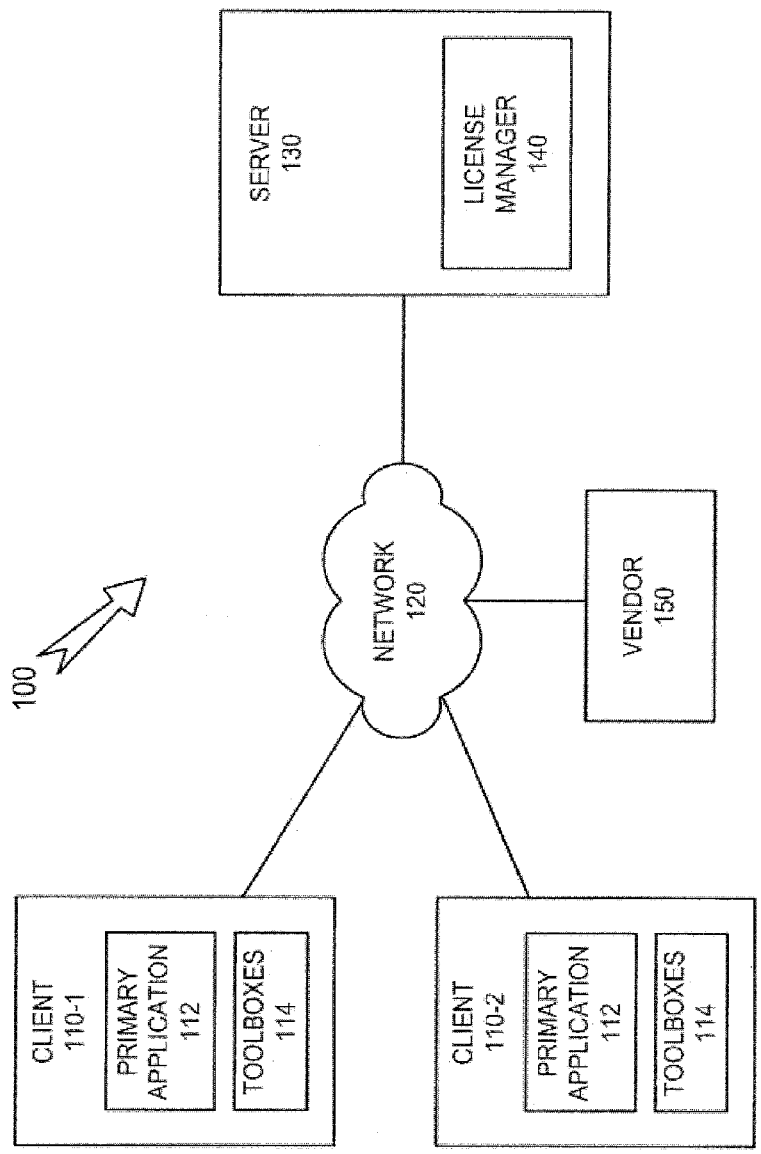
FIG. 1 illustrates an exemplary system that can be configured to practice an exemplary implementation.

The following detailed description of implementations consistent with principles of the invention refers to the accompanying drawings. The same reference numbers in different drawings may identify the same or similar elements. Also, the following detailed description does not limit the invention. Instead, the scope of the invention is defined by the appended claims and their equivalents.

Conventional software licensing schemes may require that a device have copies of all software applications and valid licenses for these applications to perform certain activities, regardless of how frequently these activities are performed. For example, a device may infrequently use a certain software application (e.g., a toolbox that operates with a host software application) that is licensed on an annual basis. A corporation, or other entity, may have to incur the cost of the annual license even though the software application is seldom used. Costs associated with this type of licensing scheme may become prohibitive when numerous devices need to run licensed software that may not be used on a continuous basis.

Exemplary implementations of the invention allow an entity to install software applications on all devices that may use the software applications whether the devices expect to use the software applications on a frequent or infrequent basis. For example, a host application and a number of toolboxes that operate with the host application may be installed on devices operating at the entity (e.g., the toolboxes may be included in the price of the host application). These exemplary implementations may allow the devices to access toolbox licenses on an as needed basis. The devices may return licenses when the devices are finished performing activities for which the licenses are required. This licensing arrangement allows entities to pay for fewer licenses while providing the entities with the flexibility to perform necessary activities with licensed software by allocating licenses to devices on a temporary basis and then subsequently reusing the licenses on other devices when earlier licensed devices are finished using the licenses.

Exemplary implementations of the invention may employ a number of techniques and may be deployed in a number of configurations for allocating licenses to devices, for terminating licenses used by devices, for monitoring license usage by devices, etc. For example, in an exemplary embodiment, a system may allow a user of a software/hardware application to perform an activity based on an operating mode of the application. For example, a user may operate a graphical modeling application in a "run only" mode when the user does not have access to an available license. A "run only" mode may let the user execute existing models but may not let the user perform other types of activities that are not permitted in the run only mode, such as editing a model, saving a model, copying a model, etc. Exemplary embodiments may let the user perform these other activities when the user is operating the application in a mode where these activities are authorized (e.g., running or executing the model in a full permission mode that supports editing, saving, copying, etc., activities). For example, the full mode may be available to the user when the user obtains an available license from a license pool.

Operating modes (e.g., full, restricted, editing, and/or other modes) may be managed according to policies, such as network policies, user policies, device policies, licensing policies (e.g., a software license policy), etc. Exemplary embodiments may further manage multiple operating modes according to a hierarchy. For example, a first operating mode may serve as a parent for one or more child operating modes that contain a subset of permissions and/or features associated with the parent mode. Exemplary embodiments may further manage operating modes on a model wide basis (e.g., an operating mode applies to an entire model), on a sub-model wide basis (e.g., an operating mode applies to a portion of a model), on a system wide basis (e.g., an operating mode applies to an entire system, such as a server or client), on a network wide basis (e.g., an operating mode applies to all devices operating on a network), etc.

Exemplary embodiments may use techniques and/or mechanisms to enable or disable determined operating modes on behalf of a user or device. For example, embodiments may include a primary or host software application that uses a primary license. The primary license may be used for managing operating modes related to a first portion of the application, such as a primary portion of the application. The device may use one or more secondary licenses to manage operating modes related to other portions of the application, such as toolboxes or application-specific software modules that operate with the primary application.

In one embodiment, a client may be allowed to perform certain activities when the client obtains (e.g., temporarily checks out) a secondary license that is associated with a secondary application. The secondary application may interact with a primary license that is associated with a primary, or host, application operating on the client. For example, a client may be running a technical computing application under a primary license. The client may be allowed to create signal processing algorithms when the client checks out a secondary license for a signal processing toolbox that operates with the technical computing application. In this implementation, the client may be restricted from performing certain activities, such as generating signal processing algorithms, when the client is not associated with the secondary license for the signal processing toolbox. In the above example, the primary application and signal processing toolbox may be installed on the client regardless of whether the client has access to the toolbox license.

Exemplary embodiments may let the client perform a determined number of activities when the client is without a permission type, such as a license. For example, the client may be allowed to execute a model that includes signal processing algorithms/functions when the client is associated with a primary license for the technical computing application but is not associated with a secondary license for the signal processing toolbox, even though the model may include signal processing blocks or functions that require the secondary license when blocks/functions are created, edited, saved, etc. In the above example, the client may not be allowed to make changes or save changes to the model unless the client obtains the secondary license that is related to the signal processing blocks/functions (e.g., by checking the secondary license out of a license pool). In another embodiment, permissions may be applied on a block wide basis instead of on a model wide basis. For example, a user may be able to modify a parameter or connection to a block for which the user has a license. In contrast, the user may only be allowed to execute a block when the user does not have a license for that block.

Exemplary embodiments that utilize primary licenses, secondary licenses, and/or other types of licenses may also support mode switching. Mode switching may occur when a client requests permission to switch from one operating mode to another operating mode (e.g., an explicit mode switching request), such as switching from a restricted operating mode (e.g., no secondary license required) to a full operating mode (e.g., a secondary license required). Mode switching may also occur when a client attempts to perform an activity that is not associated with a mode within which the client is currently operating (e.g., an implicit mode switching request). For example, a client may operate in a restricted mode that does not allow for saving a model. The client may attempt to save the model. The attempted save activity may act as a request to allow the client to switch from the restricted mode to a mode that allows saving models (e.g., a full mode).

Exemplary embodiments may allow a client to request permissions, such as secondary licenses, to perform certain activities when the client attempts to switch modes. Embodiments may manage permissions locally at the client and/or centrally via a server and/or another type of device or application. Embodiments may further be scaled to accommodate substantially any number of operating modes, primary applications, primary licenses, secondary applications, secondary licenses, clients, servers, etc.

Exemplary embodiments described herein may be related to modeling applications that can include one or more graphical models (e.g., physics models, dynamic system models, geometric models, dataflow models, discrete event models, state based models, software modeling tools, such as UML, SysML, etc.). These embodiments are representative and embodiments other than those described herein can be employed with other types of applications (e.g., non-modeling applications) and/or devices without departing from the spirit of the invention. For example, embodiments may be used with, simulation applications, code development/generation applications, technical computing applications, debugging applications, financial applications, medical applications, computer aided design (CAD) applications, electronic design automation (EDA) applications, etc.

Exemplary embodiments described in connection with the figures may use licenses to represent types of permissions or policies that can be used to control the operation/activity of one or more devices. Licenses are one of many permission/policy types that can be used with embodiments described herein and should not be construed as limiting the scope of disclosed embodiments to only license based embodiments and/or techniques.

Exemplary System

FIG. 1 illustrates an exemplary system 100 that can be configured to practice an exemplary implementation. System 100 may include clients 110-1 and 110-2 (collectively clients 110), a network 120, a server 130, a license manager 140, and a vendor 150. The embodiment of FIG. 1 is exemplary and other embodiments may include more devices, fewer devices, and/or devices in arrangements other than the arrangement of FIG. 1.

Clients 110 may include devices capable of sending data to or receiving data from network 120. "Data," as used herein, may refer to any type of machine-readable information having substantially any format that may be adapted for use in one or more networks and/or with one or more devices. Data may include packetized information and/or non-packetized information. Clients 110 may be a computer, such as a desktop computer, a laptop computer, a client, a server, a mainframe, a personal digital assistant (PDA), a web-enabled cellular telephone, a smart phone, smart sensor/actuator, or another computation or communication device that executes instructions to perform one or more activities and/or generate one or more results. In one implementation, clients 110 may operate as client devices, or endpoints, and may attempt to access resources associated with network 120, such as server 130, etc.

In one embodiment, clients 110 may include primary application 112 and one or more secondary applications (hereinafter referred to as toolboxes 114). Primary application 112 may include software-based logic and/or hardware-based logic that performs an activity. In one exemplary implementation, primary application 112 can operate with one or more toolboxes 114 or other types of application/function specific modules. Primary application 112 may operate with a primary license on clients 110 and toolboxes 114 may operate with one or more secondary licenses on clients 110.

In an embodiment, primary application 112 may include a software application that interacts with toolboxes 114. For example, primary application 112 may include logic that manages the operation of toolboxes 114, storage of data used by toolboxes 114, input and/or output activities with toolboxes 114, information exchanges with license manager 140, etc. In one implementation, primary application 112 may be required for a user to have access to functionalities provided by toolboxes 114. For example, client 110 may need to have primary application 112 (e.g., MATLAB software) installed thereon in order to run a toolbox 114 (e.g., a signal processing toolbox).

Toolboxes 114 may include software-based logic and/or hardware-based logic to provide determined types of functionality to a user of primary application 112 and/or other applications. Embodiments of toolboxes 114 may include applications that let users generate text based code to perform user determined activities, may include block sets that let users create models, may include applications that perform profiling analyses, may employ other algorithms, may allow users to connect to external applications and/or devices, etc.

Exemplary implementations of clients 110 may be allowed to perform limited or restricted activities using toolboxes 114 without having access to secondary licenses for toolboxes 114. For example, clients 110 may be able to execute an existing model without having secondary licenses for toolboxes 114 that were used to create the model. Exemplary implementations of clients 110 may be allowed to perform additional activities with a model and/or toolboxes 114 when clients 110 have access to secondary licenses for the toolboxes 114.

Network 120 may include any network capable of transferring data (e.g., packet data or non-packet data). Implementations of network 120 may include local area networks (LANs), metropolitan area networks (MANs) and/or wide area networks (WANs), such as the Internet, that may operate using substantially any network protocol, such as Internet protocol (IP), asynchronous transfer mode (ATM), and/or synchronous optical network (SONET), user datagram protocol (UDP), IEEE 802.11, etc.

Network 120 may include network devices, such as routers, switches, firewalls, and/or servers (not shown). Network 120 may be a hardwired network using wired conductors and/or optical fibers and/or may be a wireless network using free-space optical, radio frequency (RF), and/or acoustic transmission paths. In one implementation, network 120 may be a substantially open public network, such as the Internet. In another implementation, network 120 may be a more restricted network, such as a corporate virtual network. Implementations of networks and/or devices operating on networks described herein are not limited to any particular data type, and/or protocol.

Server 130 may include a device capable of receiving data from, and transmitting data to, another device and/or network. For example, server 130 may include one or more server devices/computers, a workstation, mainframe, desktop computer, laptop computer, PDA, web enabled cellular telephone, smart phone, Wi-Fi device, smart sensor/actuator, or another type of device. Implementations of server 130, and/or other devices in system 100, can include substantially any type of computing architecture/components, such as silicon-based components and/or supporting architectures, quantum-based components and/or supporting architectures, biologic-based components and/or supporting architectures, optical-based components and/or supporting architectures, etc. Exemplary embodiments of server 130 may be implemented as a standalone device, or a cluster (pool) of devices arranged in substantially any type of configuration. Distributed implementations of server 130 may include devices, such as load balancers, network devices, etc., to allow distributed implementations of server 130 to operate in a determined manner.

In one implementation, server 130 may provide a service to other devices in system 100, such as clients 110. In one implementation, server 130 may host licenses for clients 110, may provide remote storage for clients 110, may act as a gateway between clients 110 and another network, such as the Internet, etc. In one exemplary embodiment, server 130 may employ a license manager 140 to host primary licenses related to primary applications 112 and/or secondary licenses related to toolboxes 114. In another implementation, server 130 and/or license manager 140 may host applications or parts thereof.

License manager 140 may include hardware-based or software-based logic to maintain, manage, host, etc., one or more licenses (or permissions) related to software, hardware, wetware, etc., applications running on clients 110. In one embodiment, license manager 140 may exchange licensing information with the device that includes the software applications (e.g., clients 110) and/or with another device operating on behalf of the device that includes software applications. Other implementations of license manager 140 may be configured in other ways.

Assume client 110-1 has toolbox 114 installed thereon. Further assume that license manager 140 does not provide a secondary license to client 110-1 for toolbox 114. Client 110-1 may not be able to run some or all of toolbox 114 since client 110-1 does not have the required secondary license. License manager 140 may subsequently provide the required secondary license to client 110-1 to allow client 110-1 to run toolbox 114.

In one embodiment, license manager 140 may determine whether clients 110 have permission to run a model, edit a model, create a model, save a model, etc. For example, license manager 140 may use permissions to manage a number of operating modes related to clients 110, where operating modes allow clients 110 to perform determined types of activities in conjunction with software applications operating on clients 110.

Embodiments of license manager 140 may administer permissions on behalf of clients 110 according to one or more policies. Policies used to manage clients 110 can be administered globally (e.g., at a network wide or system wide level), locally (e.g., at a client device level) and/or in other ways.

For example, in one exemplary implementation, license manager 140 may maintain a first primary license for MATLAB® software and a second primary license for Simulink® software (both manufactured by the MathWorks, Inc. of Natick, Mass.), and secondary licenses for toolboxes or other code related to MATLAB software (e.g., a signal processing toolbox, an image processing toolbox, etc.) and/or block sets and/or other software for Simulink software (e.g., a report generator, an accelerator module, a target hardware module, a SimMechanics block set, a SimPowerSystems block set, a SimHydrolics™ block set, a SimEvents™ block set, etc.). For example, a user may load software from a compact disc onto a computer, where the loaded software contains functionality for MATLAB, Simulink, the SimMechanics block set, the SimPowerSystems block set, the SimHydraulics block set, the SimEvents block set, and/or other block sets. License manager 140 may provide a primary license to the computer for the MATLAB and Simulink software and may provide a first secondary license to the computer for the SimMechanics block set and a second secondary license for the SimPowerSystems block set. A user may only be allowed to insert blocks into a model when the computer has a secondary license for the appropriate block set from which the blocks are obtained.

In another embodiment, the functionality of license manager 140 may be incorporated into a standalone device (not shown in FIG. 1), such as a network device, and may communicate with server 130 and/or clients 110 over network 120.

Vendor 150 may include hardware-based logic and/or software-based logic to send software applications and/or software application information (e.g., new licenses, application configuration information, etc.) to other devices in system 100, such as server 130 and/or clients 110. In one implementation, vendor 150 may include a server operated by a company that manufactures one or more software applications related to permissions managed by license manager 140. For example, vendor 150 may include one or more servers operated by the MathWorks, Inc. and may provide copies of MATLAB software, Simulink software, and/or related software modules (e.g., toolboxes, block sets, etc.) to clients 110 and/or server 130.

In one embodiment, server 130 may contact vendor 150 when license manager 140 determines that it has an insufficient number of licenses for toolboxes 114 operating on clients 110. Server 130 may purchase a quantity of new licenses from vendor 150 and license manager 140 may make the purchased licenses available to clients 110 as needed.

Exemplary Device Architecture

Figure 2:
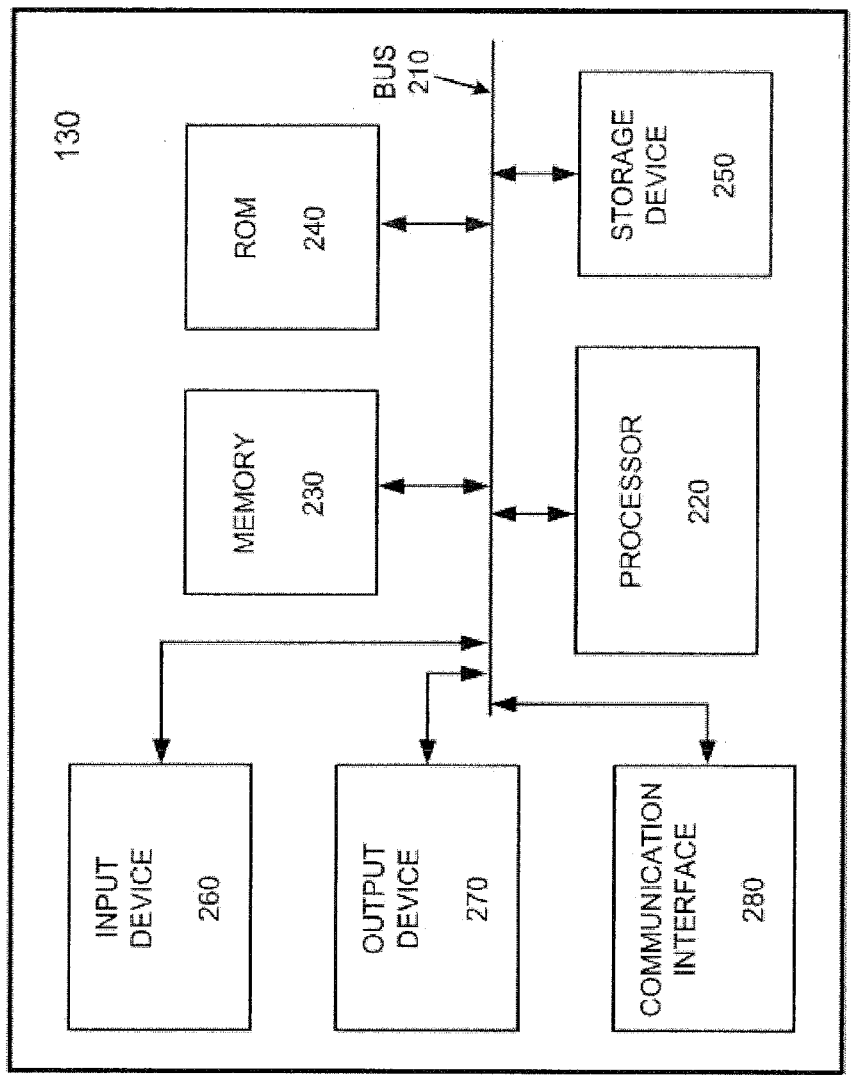
FIG. 2 illustrates an exemplary architecture for implementing the server device of FIG. 1.

FIG. 2 illustrates an exemplary architecture for implementing server 130 of FIG. 1. It will be appreciated that clients 110, a standalone license manager 140, vendor 150 and/or other devices that can be used with system 100 may be similarly configured. As illustrated in FIG. 2, server 130 may include a bus 210, a processor 220, a memory 230, a read only memory (ROM) 240, a storage device 250, an input device 260, an output device 270, and a communication interface 280.

Bus 210 may include one or more interconnects that permit communication among the components of server 130. Processor 220 may include any type of processor, microprocessor, or processing logic that may interpret and execute instructions (e.g., a field programmable gate array (FPGA)). Processor 220 may include a single device (e.g., a single core) and/or a group of devices (e.g., multi-core). Memory 230 may include a random access memory (RAM) or another type of dynamic storage device that may store information and instructions for execution by processor 220. Memory 230 may also be used to store temporary variables or other intermediate information during execution of instructions by processor 220.

ROM 240 may include a ROM device and/or another type of static storage device that may store static information and instructions for processor 220. Storage device 250 may include a magnetic disk and/or optical disk and its corresponding drive for storing information and/or instructions.

Input device 260 may include any mechanism or combination of mechanisms that permit an operator to input information to server 130, such as a keyboard, a mouse, a touch sensitive display device, a microphone, a pen-based pointing device, and/or a biometric input device, such as a voice recognition device and/or a finger print scanning device. Output device 270 may include any mechanism or combination of mechanisms that outputs information to the operator, including a display, a printer, a speaker, etc.

Communication interface 280 may include any transceiver-like mechanism that enables server 130 to communicate with other devices and/or systems, such as clients 110, license manager 140, vendor 150, etc. For example, communication interface 280 may include one or more interfaces, such as a first interface coupled to network 120 and/or a second interface coupled to license manager 140. Alternatively, communication interface 280 may include other mechanisms (e.g., a wireless interface) for communicating via a network, such as a wireless network. In one implementation, communication interface 280 may include logic to send code to a destination device, such as a target device that can include general purpose hardware (e.g., a personal computer form factor), dedicated hardware (e.g., a digital signal processing (DSP) device adapted to execute a compiled version of a model or a part of a model), etc.

Server 130 may perform certain functions in response to processor 220 executing software instructions contained in a computer-readable medium, such as memory 230. A computer-readable medium may be defined as one or more memory devices and/or carrier waves. In alternative embodiments, hardwired circuitry may be used in place of or in combination with software instructions to implement features consistent with principles of the invention. Thus, implementations consistent with principles of the invention are not limited to any specific combination of hardware circuitry and software.

Exemplary License Manager Functional Diagram

Figure 3:
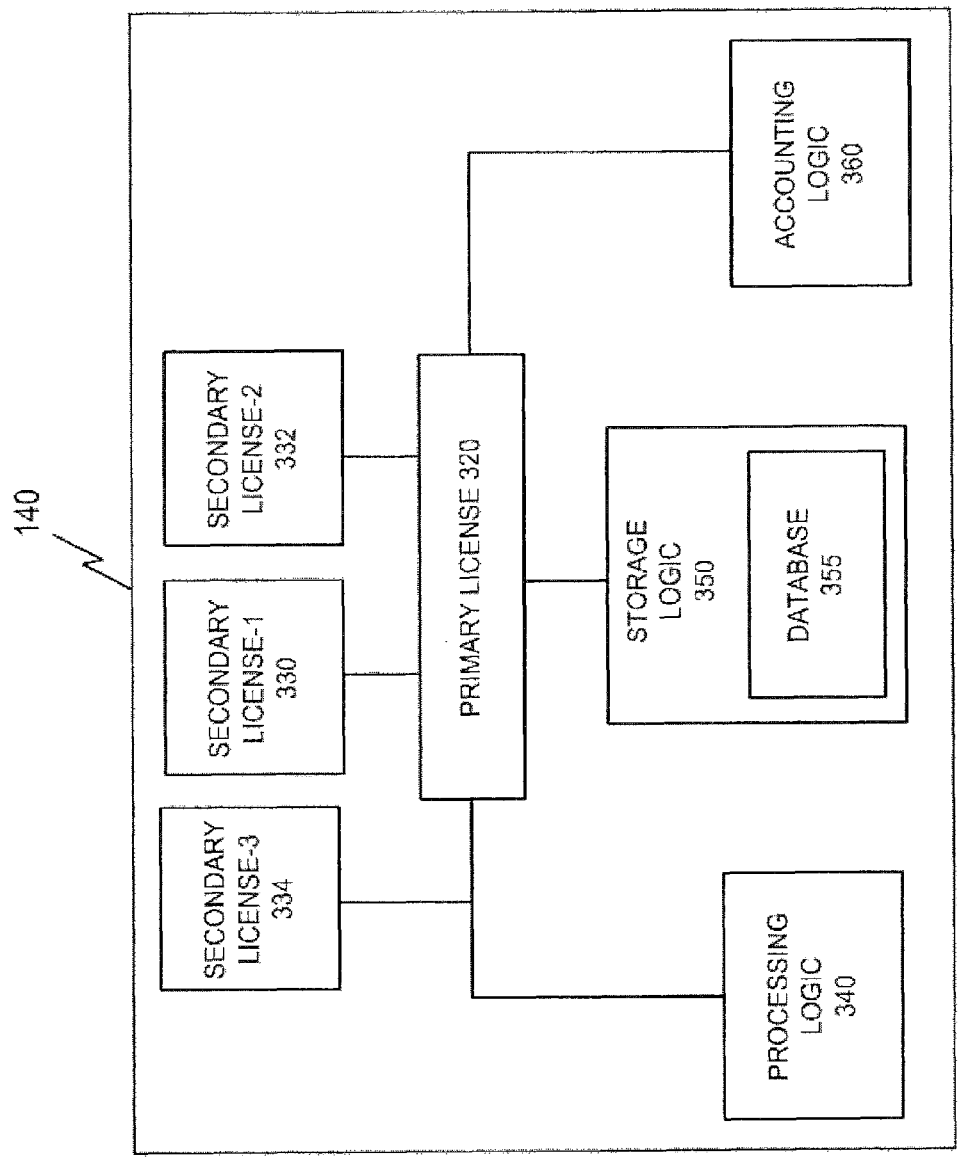
FIG. 3 illustrates an exemplary functional diagram of a license manager.

FIG. 3 illustrates an exemplary functional diagram of license manager 140. In one exemplary implementation, portions of license manager 140 may be implemented in processor 220, memory 230, ROM 240, and/or storage device 250 on server 130. Other exemplary implementations of license manager 140 may be implemented in other ways.

The functional diagram of FIG. 3 may include primary license 320, secondary licenses 330, 332, and 334 (collectively secondary licenses 330-334), evaluation logic 340, storage logic 350, database 355, and accounting logic 360. The implementation of FIG. 3 is exemplary, and license manager 140 may include more or fewer functional components without departing from the spirit of the invention.

Primary license 320 may include logic that allows a device (e.g., clients 110) to run an application when the device is authorized according to one or more determined criteria related to primary license 320. For example, primary license 320 may include code that allows clients 110 to run primary application 112. Primary license 320 may allow multiple clients 110 (e.g., clients 110-1 and 110-2) to simultaneously access primary application 112, to alternately access primary application 112 (e.g., only client 110-1 or client 110-2 can have access to primary application 112 at given time), etc. Primary license 320 may further be adapted to control access to other applications, e.g., toolboxes 114, through primary application 112 and/or another application.

Secondary licenses 330-334 may include logic that allows a device to run code when the device is authorized according to one or more determined criteria related to secondary licenses 330-334. In one implementation, secondary licenses 330-334 may be related to toolboxes 114. In another implementation, secondary licenses 330-334 may be related to primary application 112.

In one exemplary embodiment, secondary licenses 330-334 may be installed/used on top of primary license 320, i.e., a secondary license may not be installed/used unless a primary license is present (e.g., secondary licenses 330 and 332 may not be installed unless primary license 320 is present). In one implementation, a secondary license (e.g., secondary license 334) may be coupled directly to primary application 112 or to toolboxes 114 while other secondary licenses (e.g., secondary licenses 330 and 332) may be related to a primary license (e.g., primary license 320) that is in turn related to a primary application 112. In an alternative implementation, secondary licenses 330-334 may be installed onto one or more devices when no primary license is present on the one or more devices. In this alternative implementation, secondary licenses 330-334 may allow users to perform authorized activities and may prevent users from performing unauthorized activities without requiring that secondary licenses 330-334 interact with primary application 112 or primary license 320.

Exemplary embodiments may be configured to require that each type of secondary license be associated with a primary license (e.g., each copy of a secondary license for a signal processing toolbox needs to be associated with a primary license), may be configured to allow a single primary license to support multiple numbers of a type of secondary license (e.g., a single primary license may support two or more secondary licenses for a signal processing toolbox), and/or may include still other configurations. In one implementation, secondary licenses 330-334 may be related to restricted functionality, enhanced functionality, and/or different types of functionality as compared to functionality associated with primary license 320.

Evaluation logic 340 may include hardware or software based logic to process instructions or data related to licensing activities, such as license check-in or check-out, registering a license, determining whether clients 110 are authorized to interact with an application based on a license, etc.

Storage logic 350 may include hardware or software based logic to store information related to licenses. In one exemplary implementation, storage logic 350 may include database 355 to store licenses and/or license information on behalf of clients 110. For example, database 355 may maintain a pool of available secondary licenses 330-334 for toolboxes 114. License manager 140 may allocate secondary licenses 330-334 from database 355 to a client when a client requests a license (e.g., when a client checks out a license). License manager 140 may retrieve secondary licenses 330-334 from a client when the client is finished using the allocated secondary licenses 330-334.

Accounting logic 360 may include hardware or software based logic to perform activities related to processing payments for licenses, determining whether licenses are valid, etc. For example, server 130 may purchase a secondary license from vendor 150 and accounting logic 360 may process a financial transaction with vendor 150 on behalf of server 130 for the purchased secondary license. Accounting logic 360, alone or in combination with other devices/logic, may further allow licenses to be checked out by clients 110 for determined intervals, for a determined number of activities, and/or based on other parameters. Accounting logic 360 may check the license back in after the determined interval, determined number of activities, etc., are reached.

Exemplary License Data Structure

Figure 4:
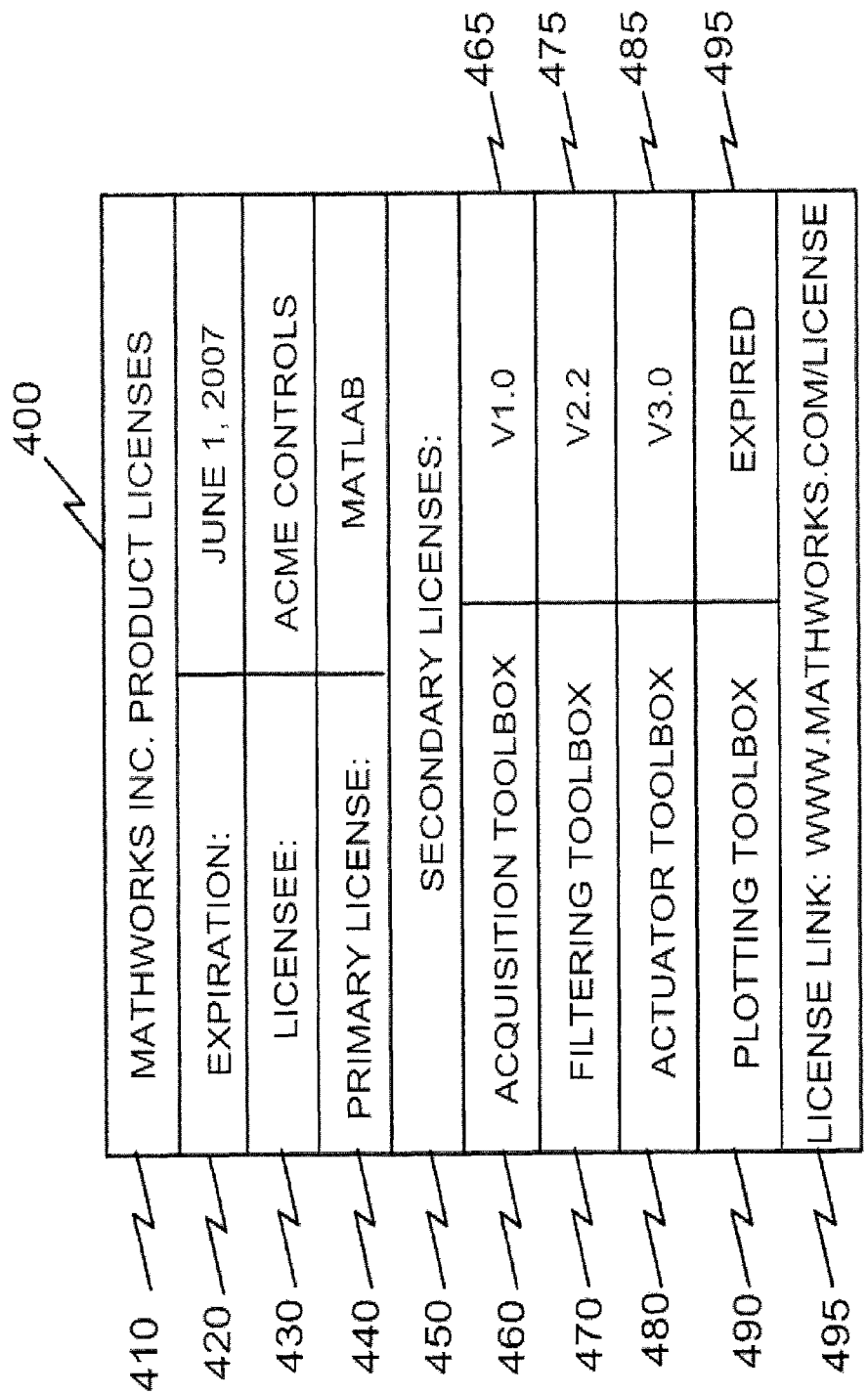
FIG. 4 illustrates an exemplary data structure for storing license information related to a software application.

FIG. 4 illustrates an exemplary data structure for storing license information related to a software application. Implementations may store license related information in a data structure, such as data structure 400, for a software application, such as primary application 112 or toolboxes 114. Data structure 400 may be implemented via a computer-readable medium that can be used to store information in a machine-readable format. Exemplary implementations may use substantially any number of data structures 400 to store license information. Implementations of data structure 400 may be populated via an operator or a device in system 100. Alternatively, information in data structure 400 can be obtained from a device not shown in FIG. 1.

In one implementation, data structure 400 may include information arranged in fields, such as title 410, expiration 420, licensee 430, primary license 440, secondary licenses 450, and link 495. Information stored in data structure 400 may be arranged in a row and column format to facilitate interpretation by users of clients 110 or server 130 and/or by other logic, such as license manager 140. Implementations of data structure 400 may be configured in other ways. For example, data structure 400 may include a key or other mechanism that may represent a license for a primary or secondary application.

Title 410 may include information that can be used to identify data structure 400. For example, in one implementation, title 410 may include information that identifies a manufacturer of one or more software applications related to license information stored in data structure 400. Expiration 420 may include information that identifies a license interval, a license expiration date, etc. Licensee 430 may include information that identifies one or more licensees. For example, licensee 430 may include the name of an entity that has purchased rights to use a software application related to primary license 320 or secondary licenses 330-334, an identifier related to a client 110 that is authorized to use a software application, etc. In one exemplary implementation, licensee 430 may include an identifier that links to a database, such as a customer database.

Primary license 440 may include license information related to a host application, such as primary application 112. In one implementation, primary license 440 may identify an application that uses one or more secondary licenses 330-334. Secondary licenses 450 may include information that identifies one or more secondary applications and/or secondary licenses (e.g., secondary license numbers) that are related to toolboxes 114. For example, in one implementation, secondary licenses 450 may include information about acquisition toolbox 460 and/or acquisition toolbox license 465, filtering toolbox 470 and/or filtering toolbox license 475, actuator toolbox 480 and/or actuator toolbox license 485, and plotting toolbox 490 and/or plotting toolbox license 495. In one implementation, information in fields 460-490 and 465-495 may be related to primary application 112 and/or primary license 320. Information in fields 465-495 may identify current versions of toolboxes 114, may identify status information for toolboxes 114 (e.g., valid, expired, busy, etc.), etc.

Link 495 may include information that identifies a destination from which license (primary or secondary) information can be obtained. In one implementation, link 495 may include a universal resource locator (URL) that identifies a web site where licenses can be purchased, reviewed, verified, etc. For example, link 495 may include information that allows a device to download a license for plotting toolbox 490 since the license for plotting toolbox 490 is expired in FIG. 4.

In an exemplary embodiment, vendor 150 may operate a web server with web services, which allow customers to purchase primary or secondary licenses, renew licenses, purchase primary or secondary applications, etc. In another exemplary embodiment, such licenses may be obtained automatically when needed and/or requested, for example by using simple object access protocol (SOAP) to contact appropriate web services. In still another exemplary embodiment, link 495 may include a field that allows a user to enter search terms that can be used to find a destination device, such as vendor 150.

Exemplary Model License

Figure 5:
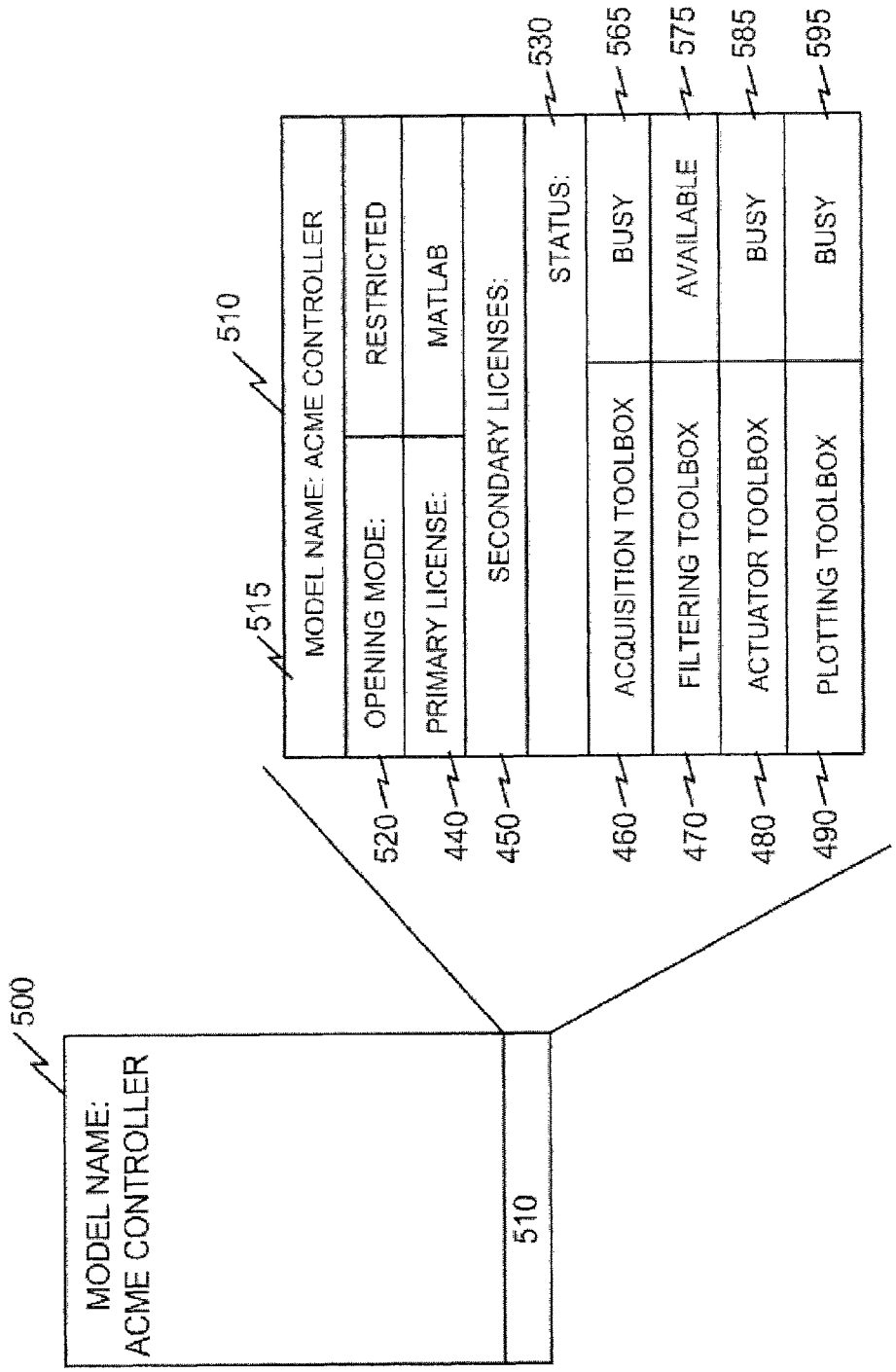
FIG. 5 illustrates an exemplary table for storing license information related to a model.

FIG. 5 illustrates an exemplary table 510 for storing license information related to model 500. In one embodiment, model 500 may include a machine-readable data structure that includes information, such as graphical representations, that can be used to simulate or analyze devices, systems, components, etc. Information in model 500 may be created using text-based, graphical, and/or other types of applications. Exemplary embodiments of model 500 may include regions (e.g., blocks, icons, subsystems, etc.) that are created using primary application 112 and/or toolboxes 114. When model 500 is saved, information about applications used to create or modify model 500 may be saved therewith. For example, in one embodiment, table 510 may be stored with model 500 and may include information related to model 500. Information in table 510 may identify a model scope (e.g., may identify model content and/or types of activities that can be performed on the model).

Table 510 may include a machine-readable medium that stores information related to model 500. In one embodiment, table 510 may include a name 515, opening mode 520, primary license 440, and secondary licenses 450 that can include information about secondary licenses 460-490, such as status 530. In one embodiment, primary license 440, secondary licenses 450, and/or secondary licenses 460-490 may be configured as, and may operate as, described in connection with FIG. 4.

Name 515 may include information that identifies model 500, such as a model name, user name, device name (e.g., an Internet protocol address of client 110-1), creation/modification date, etc. Opening mode 520 may include information that identifies how model 500 should be opened. For example, model 500 may be created and saved by an author. A user may retrieve model 500 from a storage device (e.g., storage device 250) and may open model 500 on client 110-1. Embodiments of opening mode 520 may include a hierarchy of information that can be used to identify privileges/permissions related to clients 110. Information in the hierarchy can be used to determine one or more operating modes for clients 110.

In one exemplary embodiment, opening mode 520 may include information that determines whether model 500 or portions of model 500 will be opened in a full mode (e.g., an unrestricted mode that allows a user of client 110-1 to modify model 500) or a restricted mode (e.g., a mode that allows a user of client 110-1 to perform only a subset of actions included in full mode, such as providing a user with the ability to run model 500 without allowing the user to make any changes thereto). Exemplary embodiments may allow information in opening mode 520 to be overridden, changed, etc.

In one embodiment, model 500 may be opened in a restricted mode when a secondary license 330, 332, or 334 is unavailable for one or more components in model 500.

An opening mode for model 500 may be determined by a user or by a device, such as clients 110, server 130, vendor 150, etc. Opening mode 520 can be controlled locally (e.g., client 110-1 may be allowed to set its own opening mode based on license availability) and/or may be controlled globally (e.g., server 130/license manager 140 can determine opening modes for client 110-1 and client 110-2).

Secondary licenses 450 may include a status field 530. Information in status field 530 may be related to secondary licenses, such as licenses related to toolboxes 460-490. For example, status field 530 may include an entry "busy" 565 for acquisition toolbox 460 to indicate that a secondary license for acquisition toolbox 460 is in use by another device and/or application. An entry "available" 575 for filtering toolbox 470 may indicate that a secondary license for filtering toolbox 470 is available and can be used on a device that is performing activities with model 500 (e.g., opening model 500, attempting to edit model 500, saving model 500, etc.).

In one exemplary embodiment, information in status 530 may identify the status for one or more secondary licenses 565-595 when model 500 is opened (e.g., information in status 530 may indicate that a secondary license is available, busy, expired, etc.).

Exemplary License Configuration

Figure 6A:
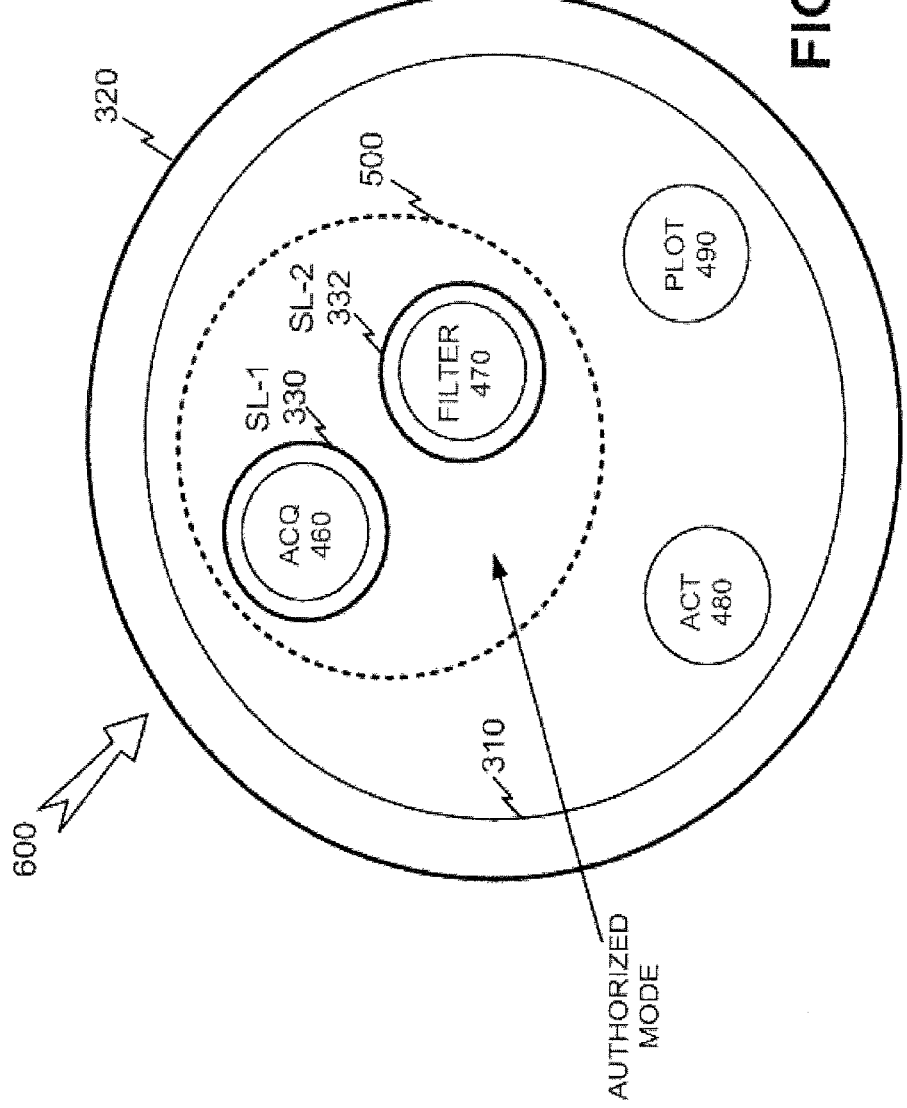
FIG. 6A illustrates an exemplary authorized operating mode.

FIG. 6A illustrates an exemplary embodiment of an authorized operating mode. Configuration 600 may be an authorized operating mode because a client has secondary licenses 330 and 332 for toolboxes 114 that are used in model 500. Configuration 600 may include primary application 112, primary license 320, secondary license 330, secondary license 332, acquisition toolbox 460, filtering toolbox 470, actuator toolbox 480, plotting toolbox 490, and model 500.

In configuration 600, primary license 320 may be associated with primary application 112, e.g., MATLAB software (FIGS. 4 and 5). Primary application 112 may work with a number of other applications, such as acquisition toolbox 460, filtering toolbox 470, actuator toolbox 480, and/or plotting toolbox 490, to perform application-specific functions. Primary license 320 may be used to administer access to and/or use of MATLAB software and may use one or more secondary licenses, e.g., secondary license 330 and/or 332, to administer access/use of one or more toolboxes, such as acquisition toolbox 460 and filtering toolbox 470.

A user of client 110-1 may need to check out acquisition toolbox 460 via secondary license 330 (or alternatively, via acquisition toolbox license 465) and filtering toolbox 470 via secondary license 332 (or alternatively, via filtering toolbox license 475) to perform certain activities in model 500, such as inserting blocks into model 500, connecting blocks in model 500, changing critical parameters in model 500, etc. In the exemplary embodiment of FIG. 6A, client 110-1 may not be able to create blocks related to actuator toolbox 480 and/or plotting toolbox 490 since licenses for these toolboxes are not associated with model 500 (e.g., secondary licenses required for actuator toolbox 480 and/or plotting toolbox 490 may be in use by client 110-2 and/or another device in system 100).

FIG. 6A illustrates that actuator toolbox 480 and/or plotting toolbox 490 are not licensed in configuration 600 by way of actuator toolbox 480 and filtering toolbox 490 not being enclosed within a secondary license (e.g., 330, 332, or 334, actuator toolbox license 485, or filtering toolbox license 495).

Actuator toolbox 480 and plotting toolbox 490 are further shown, via FIG. 6A, as not being included in model 500 by way of actuator toolbox 480 and plotting toolbox 490 not being enclosed within the dashed border of model 500.

Exemplary embodiments, such as the one shown in FIG. 6A, may allow entities (such as corporations) to purchase a copy of primary license 320 for each of clients 110 that may need access to model 500 and float (e.g., allow the temporary use of) secondary licenses among clients 110 as needed. Exemplary embodiments disclosed herein may provide entities with cost-effective ways to handle multi-user implementations of licensed software applications.

Figure 6B:
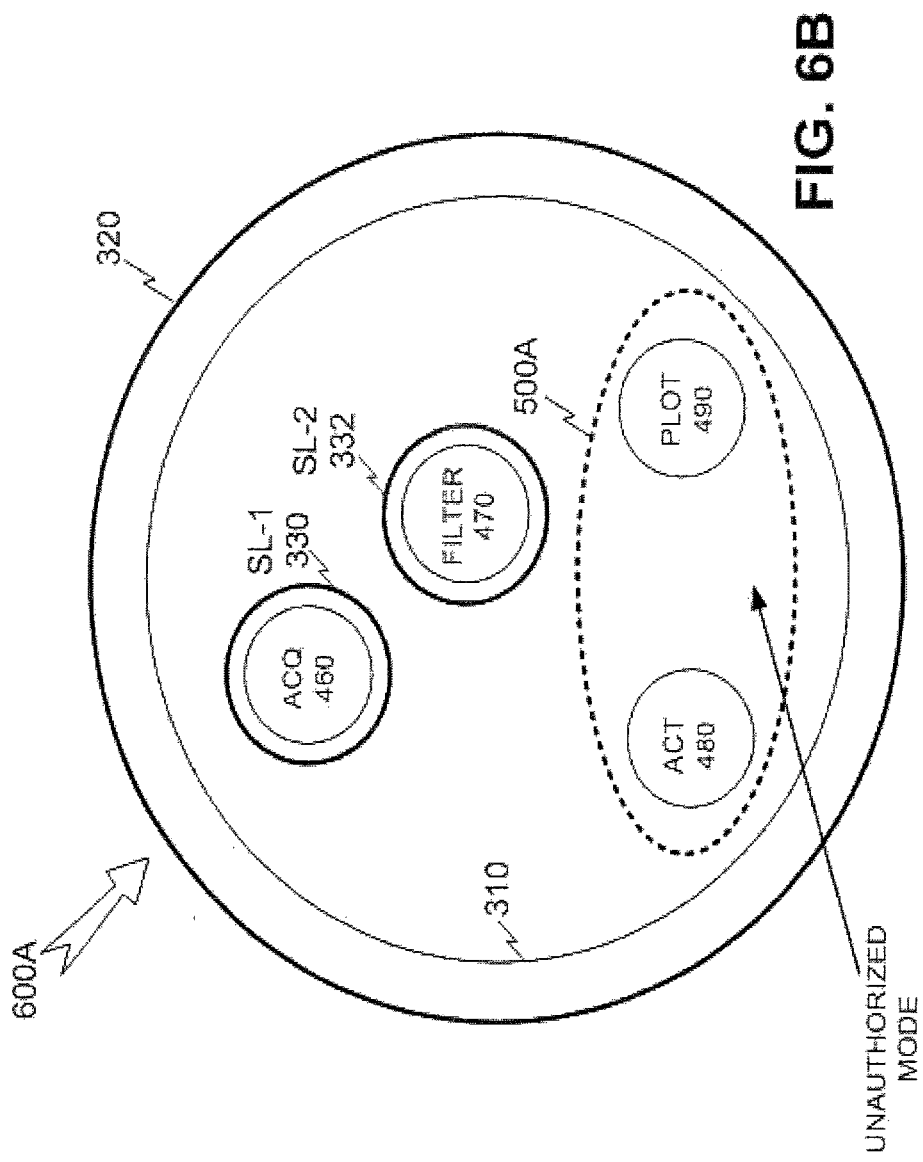
FIG. 6B illustrates an exemplary unauthorized operating mode.

FIG. 6B illustrates an exemplary unauthorized operating mode. Configuration 600A may represent an unauthorized operating mode because model 500A (shown by the dashed line) includes two unlicensed toolboxes 114, namely actuator toolbox 480 and plotting toolbox 490. A user may not be able to create, edit, save, etc., components in model 500A that are related to actuator toolbox 480 or plotting toolbox 490 because secondary licenses for these toolboxes are not associated with a device running model 500A (shown in FIG. 6B by way of actuator toolbox 480 and plotting toolbox 490 not being enclosed within secondary licenses, respectively).

In one exemplary embodiment, client 110-1 may be able to perform certain activities without having any secondary licenses checked out. For example, client 110-1 may be able to execute model 500A without any secondary licenses. By way of example, client 110-1 may be able to run a model that includes blocks related to actuator toolbox 480 even though model 500A does not have a license for actuator toolbox 480. For example, model 500A may execute blocks related to actuator toolbox 480 when model 500A does not have access to actuator toolbox license 485 when actuator toolbox 480 is included within model 500A (i.e., when actuator toolbox 480 is included within the dashed border of model 500A in FIG. 6B).

When a user of client 110-1 attempts to connect a line to a block related to actuator toolbox 480, the user may receive an error message (e.g., a visual, audible, or other type of indicator) since line connecting activities may not be considered activities that are within a model execution permission. For example, a user may attempt to connect a line between two graphical representations (e.g., blocks) related to blocks in actuator toolbox 480, where the line represents a signal connection or a data flow between the graphical representations. The user of client 110-1 may have to wait until actuator toolbox license 485 becomes available, or the user of client 110-1 may have to purchase another copy of actuator toolbox license 485 when he/she wishes to connect blocks in model 500A while an existing copy of actuator toolbox license 485 remains in use by another device and/or application in system 100.

Exemplary User Interfaces

Figure 7:
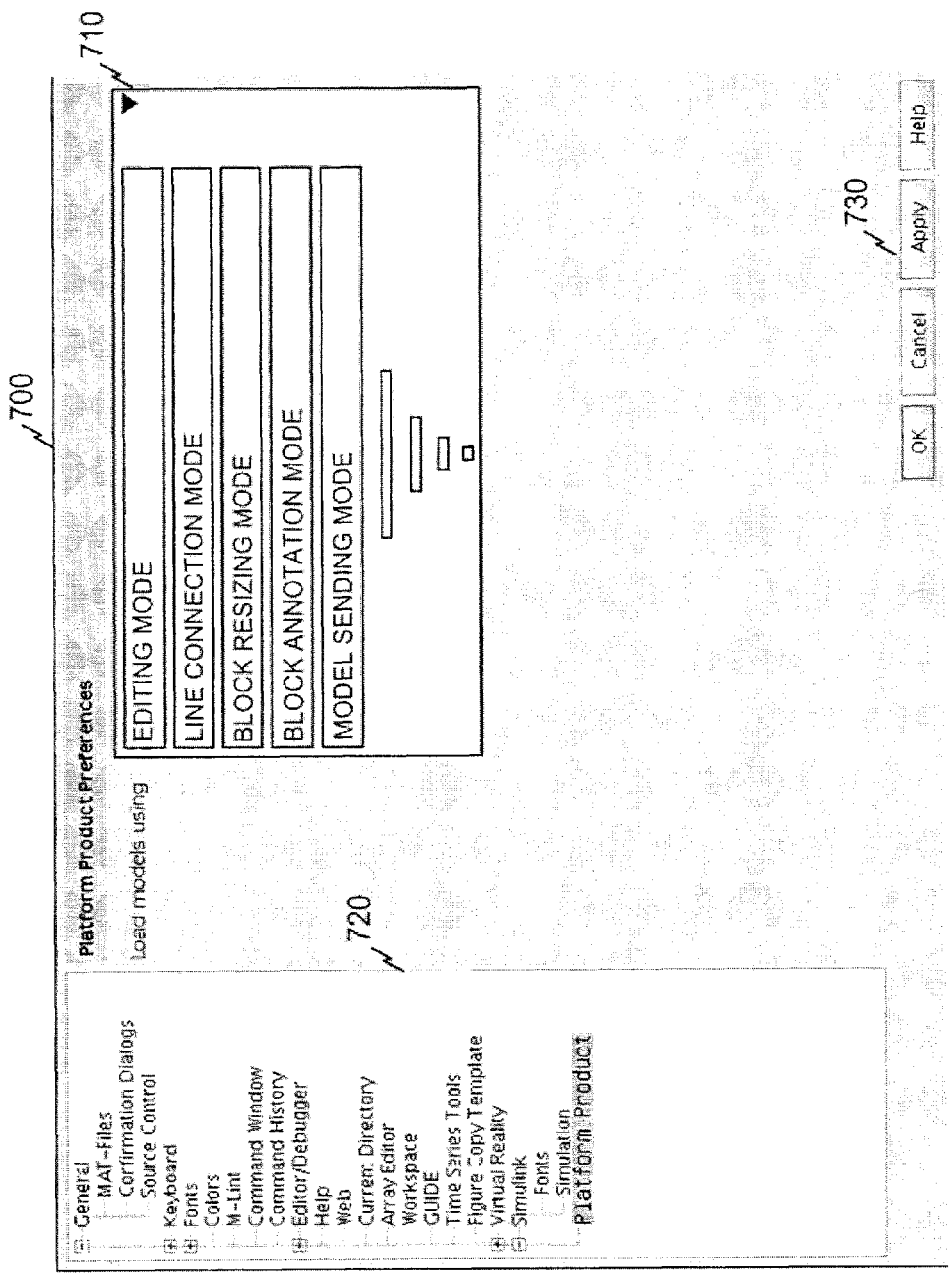
FIG. 7 illustrates an exemplary user interface that can display information about a software license and/or editing modes related to an application.

FIG. 7 illustrates an exemplary user interface that can display information about a software license and/or editing modes related to an application operating on clients 110. User interface 700 may include information related to one or more licensed software applications. Embodiments of user interface 700 can be used to identify certain users, uses, or implementations based on a configuration of system 100. For example, user interface 700 can be used to identify a preferred use of licenses and/or editing modes for determined configurations of system 100. In one exemplary embodiment, user interface 700 may be displayed to a user via a display device operating with clients 110. In other exemplary embodiments, user interface 700 may operate on other devices.

User interface 700 may include a preferences window 710, a hierarchy 720, and selection buttons 730. Preferences window 710 may provide a user with information about modes that are applied to models when the models are opened. For example, a system or a user may configure field 520 (FIG. 5) to specify how a model will be opened (e.g., may specify an opening mode for model 500). Modes may determine whether a model can be modified (e.g., edited), run, etc. For example, opening mode 520 may indicate that a model will be opened in an editing mode to allow a user to modify model 500. Exemplary embodiments may be configured to only open models in an editing mode when appropriate licenses are available (e.g., when secondary licenses related to blocks in model 500 are not currently in use by another user or model).

Preferences window 710 may include a drop down list that lets a user select a mode via a pointing device, such as a mouse, stylus, touch sensitive display, voice input, etc. Examples of opening modes 520 that can be used with preferences window 710 are, but are not limited to, an editing mode (that allows editing of certain model features), a line connection mode (that allows only line connections between blocks), a block resizing mode (that allows only block resizing), a block annotation mode (that allows only block labeling), a model sending mode (that allows sending a model to a destination device), a run mode (not shown in FIG. 7) (e.g., a mode that allows model 500 to be executed but not changed), a full mode (not shown in FIG. 7) (e.g., a mode that allows a user to perform substantially all functions with a model, such as a mode that allows model creating, editing, executing, saving, code generation, multi-running mode to perform coverage analysis, debugging, accelerated simulation, etc.), etc.

Hierarchy 720 may include a structured layout (e.g., a tree) that provides information to a user. For example, in one exemplary embodiment, hierarchy 720 may include information related to primary application 112 and/or one or more secondary applications (e.g., toolboxes 114). For example, hierarchy 720 may display information about relationships among blocks in a model. Selection buttons 730 may include logic that allows a user to enter a selection via a pointing device. For example, a user can cause his/her inputs to be accepted by license manager 140 by selecting "apply" using a pointing device.

Figure 8:
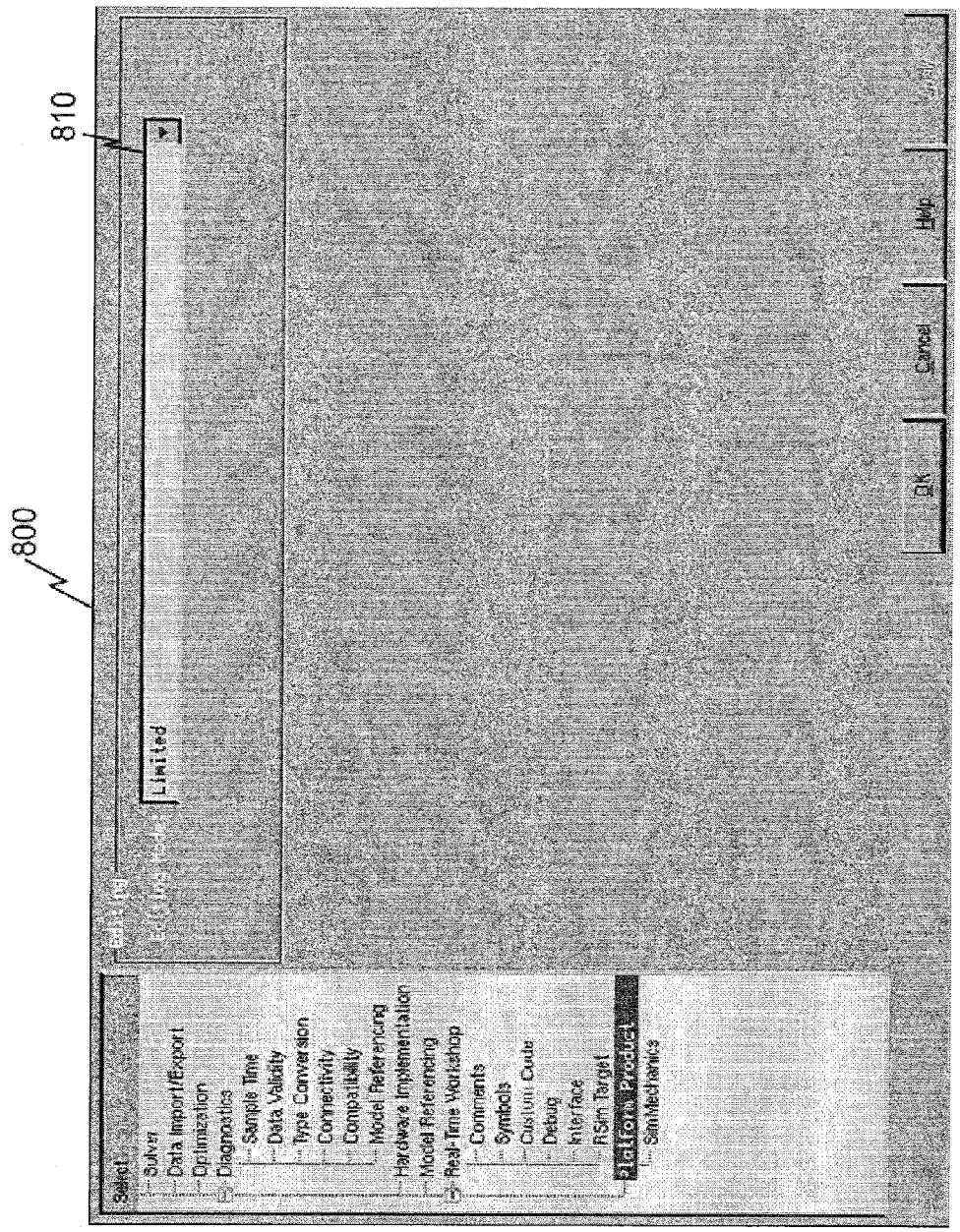
FIG. 8 illustrates an exemplary user interface that can display information related to an operating mode for a software license.

FIG. 8 illustrates an exemplary user interface that can display information related to an operating mode for a software license. In one exemplary embodiment, user interface 800 may display information for an operating mode related to a secondary application operating with a particular software license, such as a particular secondary license 330-334. User interface 800 may include mode window 810, hierarchy 820 and/or other information. Mode window 810 may include a drop down list that lets a user specify an editing mode that is used when the user opens a file, such as a model file, a source code file, a script file, a data file, a configuration file, virtual reality modeling language (VRML), etc.

User interface 800 may allow a user to select one or more operating modes. Embodiments of user interface 800 may support substantially any number of editing modes, such as a full editing mode, and substantially any number of restricted modes, etc. For example, when mode window 810 includes an entry "Full," a user may have access to substantially all privileges related to a file, a portion of a file, a repository, a database, a memory, etc. For example, when "Full" appears, a user may create code or blocks, generate connections between blocks or pieces of code, enter parameters (e.g., numerical values, text, and symbols), etc.

In contrast, when mode window 810 includes an entry "Limited," a user may have access to a determined subset of privileges related to a file. For example, a user may not be allowed to create certain types of code or graphical blocks, may not be allowed to modify/create certain types of connections, or may not be allowed to enter certain parameters when a model is opened in "Limited" mode. In one exemplary embodiment, a user may only be allowed to execute existing code or models when the code or model is opened in "Limited" mode. Exemplary embodiments may employ a hierarchy of privileges that can be assigned to substantially any number of users in substantially any arrangement.

Figure 9:
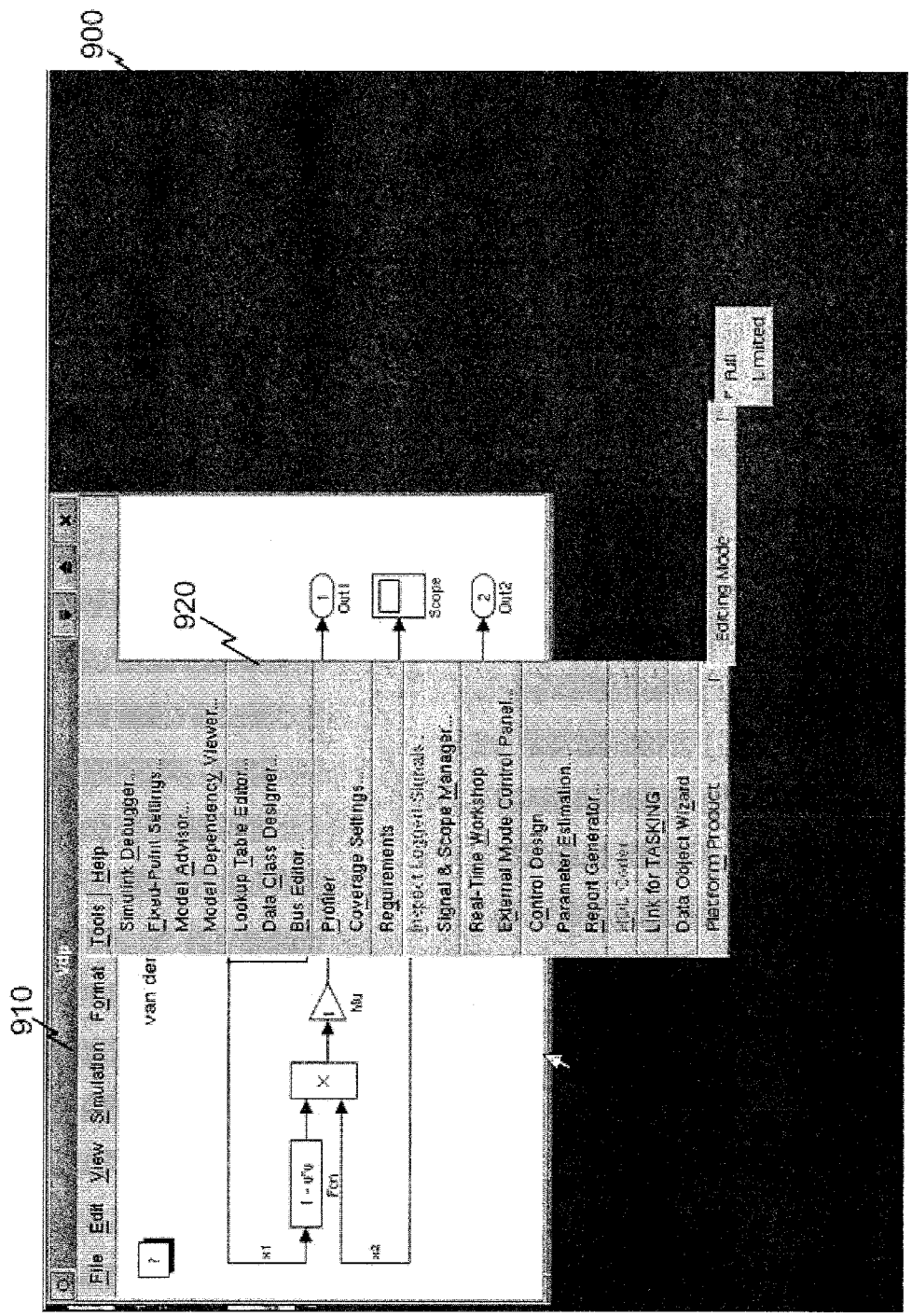
FIG. 9 illustrates an exemplary user interface that can be used by an operator to select an operating mode related to a licensed software application.

FIG. 9 illustrates an exemplary user interface that can be used by an operator to select an operating mode related to a licensed software application. The implementation of FIG. 9 may provide an alternative configuration for switching operating modes as compared to the implementation illustrated in FIG. 8. User interface 900 may include model window 910 and drop down menu 920 (hereinafter menu 920). Interface 900 may be used to display graphical representations, code, debugging information, etc., related to a model.

Model window 910 may include a portion of interface 900 that is used to display graphical representations (e.g., blocks, connections, etc.) related to a model. In one implementation, model window 910 may display icons related to a graphical modeling application (e.g., a block diagram model). For example, model window 910 may contain algebraic blocks (e.g., gain and/or attenuation blocks), logic blocks (e.g., AND, OR, etc. blocks), signal routing blocks (e.g., a bus creator block), signal transformation blocks (e.g., filtering blocks), etc. Other implementations of model window 910 may include other types of information.

Model window 910 may include a toolbar, or other mechanism, to allow a user to select certain functions. For example, a user may select "Tools" via a pointing device and may be presented with menu 920 that includes identifiers that allow a user to select determined functions. In one implementation, selecting "Tools" may allow the user to determine that an editing mode is set to "Full" and may allow the user to change the editing mode from "Full" to "Limited" and/or to another mode.

Exemplary Error Messages

Exemplary embodiments may allow users to perform determined functions based on the availability of primary and/or secondary licenses. For example, a user may be allowed to run a model when a primary license is available to the user (e.g., the user has access to a primary license but does not have access to any secondary licenses). The user may be allowed to edit portions of a model when the user has access to the primary license and a secondary license (e.g., the user can edit an input/output (I/O) block in a model when the user has access to a primary license as well as a secondary license related to the I/O blocks). The user may be allowed to perform all activities related to a model (e.g., model creation, editing, execution, etc.) when the user has access to a primary license and all secondary licenses related to information (e.g., blocks, connections, functions, etc.) in the model.

Exemplary embodiments may be configured to provide a user with error messages when the user attempts to perform an unauthorized activity. In one embodiment, system 100 may provide the user with one or more suggested solutions in conjunction with displaying an error message (e.g., system 100 may allow the user to download a temporary or permanent license for a fee, where the temporary license allows the user to perform the previously unauthorized activity).

FIGS. 10A-10D illustrate exemplary error messages that can be displayed to a user via a user interface. FIG. 10A illustrates an exemplary message that can be displayed to users of clients 110 when a user attempts to perform an unauthorized activity that may include drawing or editing a connection line in a model. For example, a user may be operating with a model in a limited (or restricted) mode that does not allow creating or editing line connections. The message of FIG. 10A may be displayed to the user in response to performing an unauthorized activity. The user may be allowed to cancel the requested activity or switch to another operating/editing mode, such as a full or unrestricted editing mode when licenses that support the requested mode are available for use or purchase.

FIG. 10B illustrates an exemplary message that may be displayed to a user when the user attempts to perform an unauthorized activity involving a model. For example, the user may interact with a model in a limited editing mode and may perform an unauthorized activity. System 100 may display the message of FIG. 10B to the user. The user may select "Stop" or "Switch to Full Editing Mode" via a pointing device.

FIG. 10C illustrates an exemplary message that can be displayed to a user when the user attempts to perform an activity that requires additional license seats, such as attempting to switch from a limited or restricted mode to a full mode. For example, a user may interact with a model and may explicitly attempt to perform an activity. For example, the user may explicitly attempt to switch operating modes related to a software application by typing a command (e.g., a switch mode command). The application operated by the user may require one or more licenses (e.g., a primary license and/or one or more secondary licenses) when switching from one authorized mode to another authorized mode. The message of FIG. 10C may be displayed to the user when he/she attempts to switch operating modes. The message of FIG. 10C may inform the user that additional licenses are required to perform the intended activity. In one embodiment, system 100 may switch to an allowed mode, i.e., a mode that can be run based on the number and/or types of licenses available to the user. In another mode, a client operated by the user may send a message (e.g., an email) to license manager 140 requesting one or more licenses needed to place the client into a desired operating mode.

FIG. 10D illustrates an exemplary message that can be displayed to a user when the user attempts to perform an activity that requires availability of one or more licenses to the user. For example, a user may have been presented with the messages of FIG. 10A or 10B in response to activities performed by the user. In response to the messages, the user may attempt to perform an activity, such as switching to full mode. The user may not be allowed to switch to full mode because one or more necessary licenses are not available. The user may be presented with the message of FIG. 10D to inform the user that the requested activity cannot be performed.

In one embodiment, the message of FIG. 10D may provide the user with one or more authorized operating modes that can be used based on a current availability of licenses. The user may select one or more of the recommended modes using a pointing device. For example, the user may select "OK" to allow the model to operate in a limited editing mode. In another embodiment, the message of FIG. 10D may provide the user with information that identifies when a license may become available (e.g., a count down timer). In still another embodiment, the message of FIG. 10D may allow the user to enter a request to retrieve a license when a license is not available. Information about the user may be placed in a queue and a license may be provided to the user when one becomes available and the user's information (e.g., a user name or other type of identifying information) is at the top of the queue.

Exemplary Processing

Figure 11:
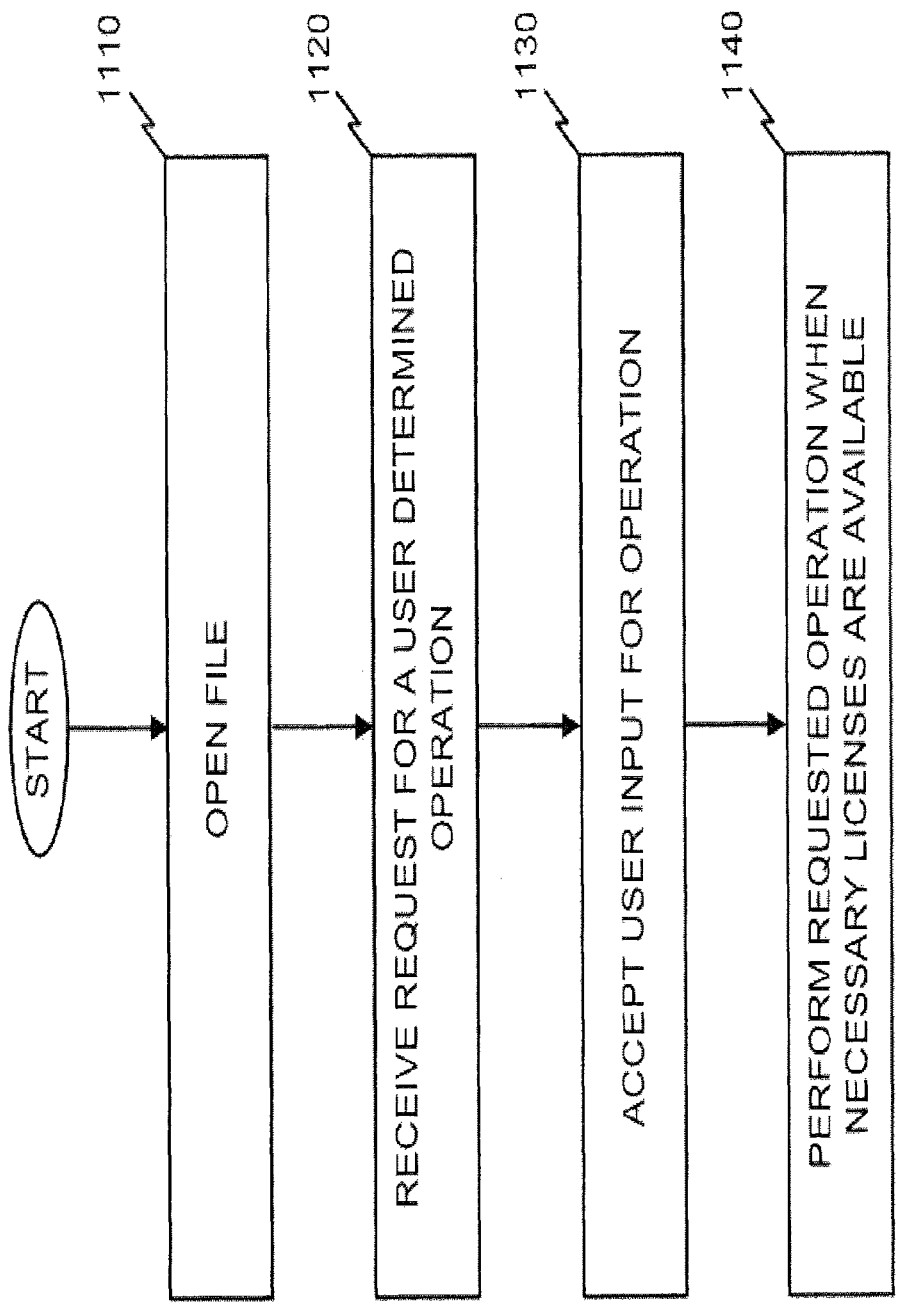
FIG. 11 illustrates exemplary processing for interacting with a model using one or more permission-based operating modes.

FIG. 11 illustrates exemplary processing for interacting with a model using one or more permission-based operating modes. A file, a repository, a database, etc., may be opened (act 1110). For example, a model file (e.g., model 500) may be retrieved from storage device 250. In one embodiment, model 500 may always be opened in a predetermined configuration, e.g., always opened in a limited, or restricted, mode (e.g., a mode that only allows model execution). In another embodiment, model 500 may be opened according to instructions included in a data structure related to model 500, e.g., table 510. For example, logic may read instructions from table 510 and may determine that a model should be opened in a full mode (e.g., with full read/write privileges). The logic may determine whether licenses related to information in model 500 are available and may open model 500 in full mode when necessary licenses are available. A user of model 500 may be presented with an error message when necessary licenses are not available to open model 500 in full mode.

Model 500 may open when necessary licenses are available to one of clients 110 (e.g., client 110-1). When model 500 is opened in a mode (e.g., full, limited, or another mode) the operating mode for model 500 may have a scope, or duration. For example, the scope may last only as long as model 500 is open, may have a timer associated therewith (e.g., model 500 may remain in full mode for a determined time and then may close or switch to another mode), may last for a determined number of activities, etc.

Assume, for sake of example, model 500 attempts to open in full mode. Further assume that logic determines that an insufficient number of licenses are available to open model 500 in full mode and that the logic opens model 500 in a limited mode that provides the user with a subset of privileges/functionality related to the full mode. For example, in an embodiment, a limited (or restricted) operating mode may allow a user to execute model 500, perform model parameter inspection, change certain parameters, generate code (or certain types of code), change data logging parameters, perform visualization changes to model 500 (e.g., zoom in or out activities, changing color/contrast of model components, etc.), add or delete blocks that are not related to primary or secondary licenses that are not in use by client 110-1, etc.

The limited operating mode may not allow client 110-1 to make or break connection lines in model 500, add or delete blocks related to primary or secondary licenses that are not in use by client 110-1, change signal types going into or leaving blocks (e.g., sensor blocks or actuator blocks), change certain configuration parameters, etc. Exemplary embodiments of system 100 may cause a message, such as the message of FIG. 10C, to be displayed to a user of client 110-1 to let the user know that model 500 is not operating in full mode.

A user of client 110-1 may attempt to draw a new connection line between two or more blocks in model 500. Client 110-1 and/or other devices in system 100 may receive a request related to the user's activities (act 1120). In one exemplary embodiment, model 500 may return an immediate error, such as the error illustrated in FIG. 10A or 10D, to inform the user that an illegal activity was attempted. In another exemplary embodiment, system 100 may accept the user's input (act 1130). For example, system 100 may draw the requested connections on model 500 and/or may allow the user to perform additional activities, such as inserting new blocks into model 500. Exemplary implementations may group activities or operations into groups and may apply operating modes to the grouped activities/operations. For example, operating modes can be applied to file opening and saving operations, block operations (e.g., operations performed on blocks), drawing operations, code generation operations (e.g., generating target device specific code based a model), topological operations (e.g., modifying a topology of a model), data transfer operations (e.g., sending or receiving information to/from a device), etc.

After performing a number of activities, the user may decide to save model 500 so that model 500 can be compiled and later executed (run). The user may select a save button on a display via a pointing device. For example, selecting the save button may indicate that the user desires to save application information (e.g., block information, connection information, block parameter information, etc.) related to model 500. In one exemplary embodiment, system 100 may return an error to the display when system 100 attempts to save model 500.

Assume, for sake of example, that the user makes unauthorized changes to model 500 based on a current operating mode and attempts to save edited model 500. License manager 140 may use evaluation logic 340 to determine that the requested save activity requires primary license 320 and a secondary license 330. Evaluation logic 340 may further determine that client 110-1 has a version of primary license 320, but does not have a copy of secondary license 330. Evaluation logic 340 may cause the message of FIG. 10B and/or other messages to be displayed on a display of client 110-1.

For example, system 100 may cause a message to be displayed on client 110-1 to inform the user that clicking on "Switch to Full Editing Mode" will cause necessary licenses (e.g., a toolbox license) to be purchased from vendor 150. Exemplary embodiments may allow client 110-1 to obtain a single use license, a license that is valid for a limited time, a license that is valid for a determined number of activities, etc. A user of client 110-1 may enter a selection via a button that causes necessary licenses to be purchased from vendor 150. System 100 may allow client 110-1 to perform the requested activity (i.e., model saving activity) when the necessary licenses have been obtained (act 1140). Once model 500 has been edited and/or saved, client 110-1 may make its license available to a license pool so that another device, e.g., client 110-2, can use the newly purchased license or a returned copy of secondary license 330 used by client 110-1 to perform an activity.

In another exemplary embodiment, system 100 may check secondary license 330 out of a license repository, or license pool, when a requested license is available. In still another exemplary embodiment, system 100 may query other devices in system 100 (e.g., client 110-2) that are using versions of secondary license 330 to determine whether any of the other devices in system 100 are willing to release a copy of secondary license 330 to client 110-1. For example, client 110-2 may be associated with a copy of secondary license 330. License manager 140 may request that client 110-2 release its copy of secondary license 330 to allow client 110-1 to perform an activity that requires secondary license 330. License manager 140 may allocate secondary license 330 to client 110-1 when client 110-2 agrees to release the license.

Implementations of license manager 140 may maintain a hierarchy of licenses/permissions and may deny low priority devices or activities access to a license/permission (e.g., a secondary license or a permission related to an application operating on clients 110) while granting another device or activity access to the license/permission.

License manager 140 may manage licenses at an application level (e.g., a toolbox level) or at other levels (e.g., a model level, a block level, and/or a subsystem level within a model). For example, license manager 140 may associate permissions with particular blocks, lines, masks, parameters, graphical appearances (e.g., color, font, shadow, highlighting), etc., in a model. Assume, for sake of example, that a first block may require a first permission for a user to execute a block while a second block can be executed without the first permission. Other implementations of license manager 140 may administer permissions/licenses in still other ways or according to other criteria, such as by line types, block types, block characteristics, etc.

Processing Related to an Exemplary Implementation

Figure 12:
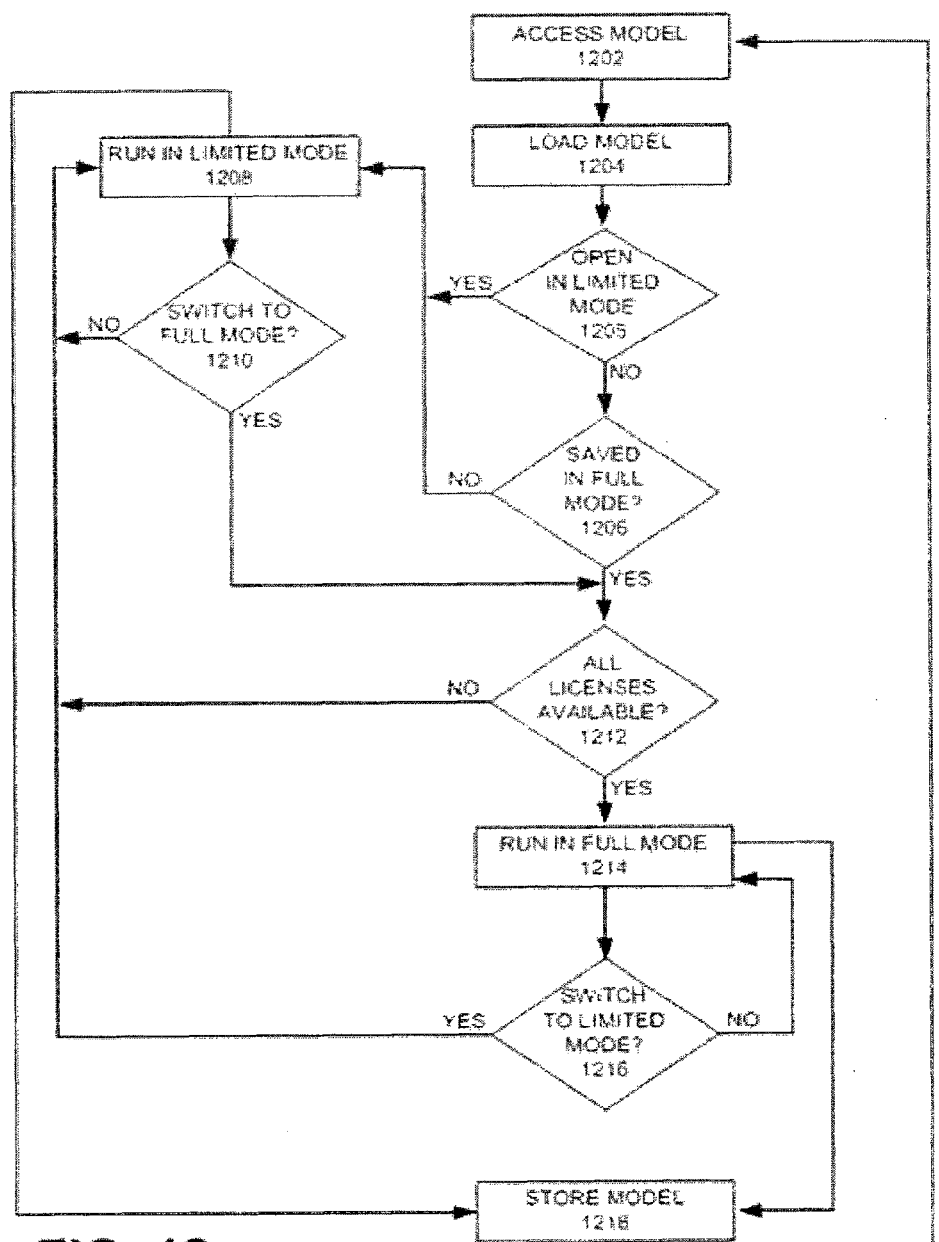
FIG. 12 illustrates processing acts related to an exemplary implementation.

FIG. 12 illustrates processing acts related to an exemplary embodiment of system 100. The processing of FIG. 12 illustrates acts that can be performed based on user inputs and/or system generated requests/commands. A model, such as model 500, may be accessed based on a user input or system command (act 1202). For example, model 500 can be retrieved from storage device 250 and loaded into memory 230 (act 1204). In one embodiment, model 500 may be loaded according to user defined preferences, such as preferences illustrated in FIG. 7. Alternatively, model 500 may be loaded according to system defined preferences or parameters.

Server 130 may determine whether model 500 should be opened in a limited, or restricted, operating mode (act 1205). Model 500 may be opened and/or run in limited mode (act 1208) after act 1205. Alternatively, act 1206 may be executed when server 130 determines that model 500 should not be opened in limited mode.

Server 130 may determine whether the loaded version of model 500 was previously saved in full mode (act 1206). For example, when server 130 determines that model 500 was previously save in limited mode, server 130 may run model 500 in limited mode (act 1208). In contrast, when server 130 determines that model 500 was saved in full mode, server 130 may determine whether all secondary licenses related to model 500 are available (act 1212).

Server 130 may run model 500 in full mode when all secondary licenses related to model 500 are available (act 1214). In contrast, when server 130 determines that all secondary licenses are not available to model 500, server 130 may cause model 500 to be opened in limited mode (act 1208). When model 500 is run in full mode (act 1214) model 500 may be stored in storage device 250 or elsewhere in server 130 (act 1218).

Server 130 may determine whether model 500 should be switched from full mode (act 1214) to limited mode (act 1216). Server 130 may place model 500 into limited mode (act 1208) when server 130 determines that model 500 should be switched from full to limited mode in act 1216. Server 130 may allow model 500 to run in full mode (act 1214) when server 130 does not determine that model 500 should be switched to limited mode in act 1216.

When server 130 allows model 500 to operate in limited mode (act 1208), server 130 may attempt to determine whether a request is received to switch model 500 from limited mode to full mode (act 1210). When server 130 determines that a request for full mode is received, acts 1212 and 1214 may be executed. In contrast, when server 130 determines that a request to switch to full mode was not received, process flow may return to act 1208. Client 110-1 or 110-2 and/or server 130 may store model 500 from a limited mode or a full mode via act 1218.

Exemplary Alternative Implementations

Many alternative implementations are possible based on the foregoing description. For example, a first alternative implementation may provide users of clients 110 with a banner that identifies the operating mode for a model. For example, a border of a model window may include text that identifies that the model is running in a limited mode, a full mode, or another type of mode.

A second alternative implementation may include a "license" or "permission" command or button that can be selected by a user. The license command/button may provide a user with a listing of primary licenses/permissions and secondary licenses/permissions currently in use by a model or a device, required to perform certain activities in a model or on a device, etc. The license/permission command/button may further allow the user to purchase, borrow, or otherwise obtain licenses/permissions that are needed to perform desired activities in the model or on the device.

A third alternative implementation may allow a user of client 110-1 to query other clients in system 100 to request one or more primary or secondary licenses/permissions that may be required to allow client 110-1 to perform desired activities.

A fourth alternative implementation may include an automated license assistant that provides client 110-1 with a pop-up window, or other information conveyance mechanism, when a desired license/permission becomes available. For example, client 110-1 may have requested a secondary license/permission from license manager 140. License manager 140 may not have been able to fulfill the request and may have placed client 110-1 on a waiting list (or placed in a queue) for the secondary license/permission. When the secondary license/permission becomes available, client 110-1 may receive a message that asks client 110-1 whether the secondary license/permission is still needed. Client 110-1 may receive the secondary license/permission when client 110-1 indicates that it still needs the secondary license/permission.

A fifth alternative implementation may provide license manager 140 with license/permission check in/check out capabilities. License manager 140 may allow clients 110 to check out licenses/permissions for determined intervals, activities, or according to other determined criteria. License manager 140 may further allow clients 110 to return licenses/permissions when clients 110 are finished with the licenses/permissions, such as when a client is turned off or exits a modeling application.

A sixth alternative implementation may include a checksum or another type of identifier that is written into table 510, into a portion of model 500, or elsewhere in system 100 to identify a mode in which model 500 was saved. For example, model 500 may have been operating in an unauthorized mode when it was saved. The checksum may indicate that model 500 was saved from an unauthorized mode. When model 500 is opened, the checksum may be read and an error message may be displayed to a user. The user may be required to obtain necessary secondary licenses, pay penalty fee, perform other activities, etc., to open model 500 in an authorized mode. In one implementation, the user may be prevented from interacting with model 500 until model 500 can be opened in an authorized mode. Checksums and/or other types of identifiers may further be used to identify parameter values within a model. The checksum/other identifier may be used to detect when parameter changes are made while in a restricted operating mode. For example, the checksum/other identifier can be used to identify the changed parameters at a later time, such as when the model is later accessed, saved, sent to a destination, executed, etc.

A seventh alternative implementation may employ a topological structure with model 500. The topological structure may include one or more layers. For example, model 500 may be made of a number of layers where each layer includes a portion of the information making up model 500. License manager 140 may require that clients 110 have all secondary licenses/permissions needed to interact with each layer of model 500 before allowing model 500 to be opened in an authorized mode. For example, a first secondary license/permission may be required for a user to interact with a first layer in model 500, a second secondary license/permission may be required for a user to interact with a second layer of model 500, etc.

An eighth alternative implementation may allow license manager 140 to use global permissions among clients 110. For example, license manager 140 may employ a global permission setting that overrides any local license/permission settings on clients 110 (e.g., permissions identified in table 510). Global permissions may allow license manager 140 to dynamically manage secondary licenses/permissions and/or primary licenses/permissions among clients 110 in a centralized fashion. In one implementation, license manager 140 may employ a permission hierarchy among clients 110, e.g., client 110-1 may have a first permission that is higher than a second permission associated with client 110-2. As a result, client 110-2 may not receive secondary licenses/permissions unless client 110-1 does not need them. Information about global permissions can be displayed to users of clients 110 via user interfaces, such as interface 700 (FIG. 7).

A ninth alternative implementation may include nested secondary licenses that can be arranged in a hierarchy. For example, a primary license may operate as a parent license and a secondary license may operate as a child license. Clients 110 may need the child license to perform a function, such as a signal processing activity. The child license may include one or more child licenses (grandchildren with respect to the parent license) associated therewith. For example, the secondary license may include a first sub-secondary license to perform fast Fourier transforms (FFTs) in a signal processing application related to the secondary license. The secondary license may further include a second sub-secondary license to allow clients 110 to perform matched filtering activities. Alternative implementations may include substantially any number of parent licenses, child licenses, grand child licenses, etc., in substantially any configuration.

A tenth alternative implementation may include a status bar on a display device related to client 110-1 or 110-2. The status bar may display information about an operating mode related to clients 110, information about a license queue position for client 110-1 or client 110-2 when client 110-1 or 110-2 is waiting for a license to become available, etc.

An eleventh alternative implementation may maintain relationships between secondary licenses. For example, a first license may be required to perform a first group of activities and a combination that includes a second license and a third license may be required to perform the first group of activities. A user may request the first license and may be denied because the first license is in use by another user or device. License manager 140 may provide the user with a message that indicates that the second license and the third license are available and will allow performing the first group of activities when combined on the user's device. The user may accept the second license and the third license and may perform the first group of activities via an authorized operating mode.

In a twelfth alternative implementation, a primary application may include a number of code portions that can be controlled by respective permissions or policies. For example, a user may need a first license to access a first portion of the primary application and a second license to access a second portion of the primary application. Permissions may be further configured to allow a combination of permissions (e.g., the second license and a third license) to permit access to portions of the primary application that are accessible via another permission (e.g., the first license). For example, the first license may not be available but the second license and a third license may be available, where neither the second license nor the third license individually will allow access to the first portion of the primary application. A user may receive a message that indicates authorized access can be gained to the first portion of the primary application by using the second license and the third license in combination. The user may download the second license and third license and may access the first portion of the primary application. Alternative implementations can use substantially any number of permissions in substantially any combination to access portions of a primary application. Alternative implementations may further use optimization schemes to determine how best to allocate and/or combine licenses with respect to portions of the primary application and/or secondary applications that may operate with the primary application. For example, a software vendor may want to maximize revenue related to the use of multiple secondary licenses with a primary application. The software vendor may optimize the way licenses are combined and/or related to portions of the primary application so that customers cannot take advantage of license combinations that may be devalued with respect to other license combinations. Optimizations can be performed with respect to substantially any number of parameters or metrics. The parameters and/or metrics may or may not be related to revenue (e.g., parameters/metrics may be related to minimizing/maximizing license reuse, controlling time intervals over which licenses are used, etc.).

Still other alternative implementations are possible consistent with the spirit of the invention.

CONCLUSION

Implementations may provide for dynamic license/permission sharing among devices in a system, such as a networked computing environment. Implementations may further allow devices to perform certain functions without licenses/permissions, such as running a model, while requiring that devices have licenses/permissions to perform other types of activities, such as editing a model. In addition, implementations may allow devices to perform determined functions with a subset of a number of available licenses/permissions, while preventing the devices from performing other functions without additional licenses/permissions.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while a series of acts has been described with regard to FIGS. 11-12, the order of the acts may be modified in other implementations consistent with the principles of the invention. Further, non-dependent acts may be performed in parallel.

In addition, implementations consistent with principles of the invention can be implemented using devices and configurations other than those illustrated in the figures and described in the specification without departing from the spirit of the invention. Devices and/or components may be added and/or removed from the implementations of FIGS. 1-3 depending on specific deployments and/or applications. Further, disclosed implementations may not be limited to any specific combination of hardware.

Further, certain portions of the invention may be implemented as "logic" that performs one or more functions. This logic may include hardware, such as hardwired logic, an application-specific integrated circuit, a field programmable gate array, a microprocessor, software, wetware, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A device, comprising:
   a processor executing evaluation logic to:
   allow an application to run in a first mode when a license is available and associated with the application, where:
   the application is a graphical modeling application,
   the application includes a graphical model,
   the first mode allows a client to perform a first activity, and
   the first mode allows the client to perform other activities distinct from the first activity; and
   allow the application to run in a second mode when the license is unavailable, where:
   the second mode allows the client to perform a subset of the activities included in the first mode, where the subset of the activities:
   excludes the first activity, and
   includes the other activities; and
   generates a response, where the response includes a permission that: allows the application to run in the first mode when the license is associated with the application, and allows the application to run in the second mode when the license is unavailable.

2. The device of claim 1, further comprising an interface to:
   receive a request from the client when the client is executing the application, the request related to one or more activities associated with the application, where the one or more activities can include activities in the first mode or the second mode, and
   send the response to the client based on information about the one or more activities.

3. The device of claim 2, wherein the evaluation logic is to:
   determine when the license becomes available when the application is operating in the second mode, and
   associate the license with the application; and
   wherein the interface is to:
   send an updated response to the client, the updated response allowing the application to transition from the second mode to the first mode.

4. The device of claim 2, wherein the evaluation logic is to:
   obtain a new license from a destination when the license is unavailable, and
   associate the new license with the client, where the new license allows the application to operate in the first mode.

5. The device of claim 4, wherein the evaluation logic is further to:
   perform a financial transaction when the new license is obtained, the financial transaction related to obtaining the new license on behalf of the client.

6. The device of claim 2, wherein the evaluation logic is to:
   process a second request on behalf of the client, the second request indicating that the application is attempting to switch:
   from the second mode to another mode, or
   from the first mode to the another mode, and
   generate a new response that comprises a new permission allowing the application to switch:
   from the second mode to the another mode, or
   from the first mode to the another mode.

7. The device of claim 6, wherein the evaluation logic is further to:
   generate the new permission when a license for the another mode is available and the application requests to switch from the second mode to the another mode.

8. The device of claim 1, wherein the application is a secondary application that operates with a primary application that is associated with a primary license.

9. A non-transitory computer readable medium storing instructions, the instructions comprising: one or more instructions that, when executed by a processor of a device, cause the processor to:
   allow an application to run in a first mode when a license is available and associated with the application, where:
   the application is a graphical modeling application,
   the application includes a graphical model,
   the first mode allows a client to perform a first activity, and
   the first mode allows the client to perform other activities distinct from the first activity; and
   allow the application to run in a second mode when the license is unavailable, where:
   the second mode allows the client to perform a subset of the activities included in the first mode, where the subset of the activities:
   excludes the first activity, and
   includes the other activities; and
   generate a response, where the response includes a permission that: allows the application to run in the first mode when the license is associated with the application, and allows the application to run in the second mode when the license is unavailable.

10. The medium of claim 9, further storing instructions, the instructions comprising:
    one or more instructions that, when executed by a processor of a device, cause the processor to:
    receive a request from the client when the client is executing the application, the request related to one or more activities associated with the application, where the one or more activities can include activities in the first mode or the second mode; and
    send the response to the client based on information about the one or more activities.

11. The medium of claim 10, further storing instructions, the instructions comprising:
one or more instructions that, when executed by a processor of a device, cause the processor to:
determine when the license becomes available when the application is operating in the second mode;
associate the license with the application; and
send an updated response to the client, the updated response allowing the application to transition from the second mode to the first mode.

12. The medium of claim 10, further storing instructions, the instructions comprising:
one or more instructions that, when executed by a processor of a device, cause the processor to:
obtain a new license from a destination when the license is unavailable; and
associate the new license with the client, where the new license allows the application to operate in the first mode.

13. The medium of claim 12, further storing instructions, the instructions comprising:
one or more instructions that, when executed by a processor of a device, cause the processor to:
perform a financial transaction when the new license is obtained, the financial transaction related to obtaining the new license on behalf of the client.

14. The medium of claim 10, further storing instructions, the instructions comprising:
one or more instructions that, when executed by a processor of a device, cause the processor to:
process a second request on behalf of the client, the second request indicating that the application is attempting to switch from the second mode to another mode or from the first mode to the another mode, and
generate a new response that comprises a new permission allowing the application to switch from the second mode to the another mode or from the first mode to the another mode.

15. The medium of claim 14, further storing instructions, the instructions comprising:
one or more instructions that, when executed by a processor of a device, cause the processor to:
generate the new permission when a license for the another mode is available and the application desires to switch from the second mode to the another mode.

16. The medium of claim 9, wherein the application is a secondary application that operates with a primary application that is associated with a primary license.

17. An electronic device implemented method, comprising:
allowing, using a processor of the electronic device, an application to run in a first mode when a license is available and associated with the application, where:
the application is a graphical modeling application,
the application includes a graphical model,
the first mode allows a client to perform a first activity, and
the first mode allows the client to perform other activities distinct from the first activity; and
allowing, using the processor of the electronic device, the application to run in a second mode when the license is unavailable, where:
the second mode allows the client to perform a subset of the activities included in the first mode, where the subset of the activities:
excludes the first activity, and
includes the other activities;
generating a response, where the response includes a permission that: allows the application to run in the first mode when the license is associated with the application, and allows the application to run in the second mode when the license is unavailable.

18. The method of claim 17, further comprising:
receiving a request from the client when the client is executing the application, the request related to one or more activities associated with the application, where the one or more activities can include activities in the first mode or the second mode; and
sending the response to the client based on information about the one or more activities.

19. The method of claim 18, further comprising:
determining when the license becomes available when the application is operating in the second mode;
associating the license with the application; and
sending an updated response to the client, the updated response allowing the application to transition from the second mode to the first mode.

20. The method of claim 18, further comprising:
obtaining a new license from a destination when the license is unavailable; and
associating the new license with the client, where the new license allows the application to operate in the first mode.

21. The method of claim 20, further comprising:
performing a financial transaction when the new license is obtained, the financial transaction related to obtaining the new license on behalf of the client.

22. The method of claim 18, further comprising:
processing a second request on behalf of the client, the second request indicating that the application is attempting to switch from the second mode to another mode or from the first mode to the another mode, and
generating a new response that comprises a new permission allowing the application to switch from the second mode to the another mode or from the first mode to the another mode.

23. The method of claim 22, further comprising:
generating the new permission when a license for the another mode is available and the application desires to switch from the second mode to the another mode.

24. The method of claim 17, wherein the application is a secondary application that operates with a primary application that is associated with a primary license.

* * * * *

UNITED STATES PATENT AND TRADEMARK OFFICE
CERTIFICATE OF CORRECTION

| | | |
|---|---|---|
| PATENT NO. | : 8,719,949 B1 | Page 1 of 1 |
| APPLICATION NO. | : 13/556883 | |
| DATED | : May 6, 2014 | |
| INVENTOR(S) | : Nathan E. Brewton et al. | |

It is certified that error appears in the above-identified patent and that said Letters Patent is hereby corrected as shown below:

On the title page item (*) below the Patent Term Adjustment Notice, insert --This patent is subject to a terminal disclaimer.--

Signed and Sealed this
Fourth Day of August, 2015

Michelle K. Lee
*Director of the United States Patent and Trademark Office*